(12) United States Patent
Schneider

(10) Patent No.: US 6,732,293 B1
(45) Date of Patent: May 4, 2004

(54) METHOD, SOFTWARE AND APPARATUS FOR RECOVERING AND RECYCLING DATA IN CONJUNCTION WITH AN OPERATING SYSTEM

(75) Inventor: Eric D. Schneider, Plymouth, MN (US)

(73) Assignee: Symantec Corporation, Cupertino, CA (US)

( * ) Notice: Subject to any disclaimer, the term of this patent is extended or adjusted under 35 U.S.C. 154(b) by 525 days.

(21) Appl. No.: 09/684,348

(22) Filed: Oct. 6, 2000

Related U.S. Application Data

(63) Continuation-in-part of application No. 09/450,266, filed on Nov. 29, 1999, now Pat. No. 6,240,527, which is a continuation of application No. 09/105,733, filed on Jun. 26, 1998, now Pat. No. 6,016,553, which is a continuation-in-part of application No. 09/039,650, filed on Mar. 16, 1998, now abandoned.

(60) Provisional application No. 60/158,336, filed on Oct. 7, 1999.

(51) Int. Cl.[7] .......................... H02H 3/05; G06F 12/00; G06F 17/30

(52) U.S. Cl. .......................... 714/15; 714/21; 711/161; 711/162; 707/202

(58) Field of Search .......................... 714/6, 7, 13, 15, 714/20, 21; 711/103, 112, 114, 161, 162; 707/202

(56) References Cited

U.S. PATENT DOCUMENTS

| | | | |
|---|---|---|---|
| 5,089,958 A | | 2/1992 | Horton et al. |
| 5,255,270 A | | 10/1993 | Yanai et al. |
| 5,297,258 A | | 3/1994 | Hale et al. |
| 5,325,519 A | * | 6/1994 | Long et al. .................. 714/15 |
| 5,331,646 A | | 7/1994 | Krueger et al. |
| 5,339,406 A | | 8/1994 | Carney et al. |
| 5,381,545 A | | 1/1995 | Baker et al. |
| 5,404,361 A | * | 4/1995 | Casorso et al. .............. 714/767 |
| 5,487,160 A | | 1/1996 | Bemis |
| 5,524,205 A | | 6/1996 | Lomet et al. |

(List continued on next page.)

FOREIGN PATENT DOCUMENTS

| | | |
|---|---|---|
| EP | 1091299 A2 | 4/2001 |
| EP | 0751462 B1 | 7/2002 |
| WO | WO 91/01026 | 1/1991 |
| WO | WO 96/12232 | 4/1996 |
| WO | WO 98/26353 | 6/1998 |

(List continued on next page.)

OTHER PUBLICATIONS

Rodriguez–Rivera et al., Proceedings of the International Symposium on Memory Management, Vancouver, Canada, Oct. 17–19, 1998, pp. 79–85, especially Figure 3 and pp. 82–83 –footprint reduction.

(List continued on next page.)

*Primary Examiner*—Robert Beausoliel
*Assistant Examiner*—Emerson Puente
(74) *Attorney, Agent, or Firm*—Fenwick & West LLP

(57) ABSTRACT

An invention is disclosed for recovering data in computer environment. Initially a record of historic states of a disk is created, wherein the disk includes various disk locations, such as a disk location X, a disk location Y, and a disk location Z. In response to a request to overwrite original data at the disk location X with new data, the new data is stored at the disk location Y. Then, an indication is established in the record of historic states that indicates the roles of disk location X and Y. These roles could establish the role of disk location X as including historic data, and the role of location Y as including new data for location X. In addition, the method includes intercepting a command to Ski release data at the disk location Z, and establishing an indication in the record of historic states indicating the disk location Z stores historic data.

25 Claims, 17 Drawing Sheets

U.S. PATENT DOCUMENTS

| | | | |
|---|---|---|---|
| 5,535,188 A | | 7/1996 | Dang et al. |
| 5,557,770 A | | 9/1996 | Bhide et al. |
| 5,598,528 A | * | 1/1997 | Larson et al. .................. 714/7 |
| 5,604,853 A | | 2/1997 | Nagashima |
| 5,604,862 A | | 2/1997 | Midgely et al. |
| 5,640,561 A | | 6/1997 | Satoh et al. |
| 5,659,747 A | | 8/1997 | Nakajima |
| 5,677,952 A | | 10/1997 | Blakley, III et al. |
| 5,717,849 A | | 2/1998 | Brady |
| 5,751,936 A | | 5/1998 | Larson et al. |
| 5,761,680 A | | 6/1998 | Cohen et al. |
| 5,778,392 A | | 7/1998 | Stockman et al. |
| 5,802,264 A | * | 9/1998 | Chen et al. .................... 714/6 |
| 5,835,953 A | | 11/1998 | Ohran |
| 5,893,140 A | | 4/1999 | Vahalia et al. |
| 5,933,368 A | * | 8/1999 | Ma et al. ............... 365/185.33 |
| 5,982,886 A | | 11/1999 | Itami et al. |
| 6,012,145 A | | 1/2000 | Mathers et al. |
| 6,016,553 A | | 1/2000 | Schneider et al. |
| 6,199,178 B1 | | 3/2001 | Schneider et al. |
| 6,240,527 B1 | | 5/2001 | Schneider et al. |
| 6,363,487 B1 | | 3/2002 | Schneider |

FOREIGN PATENT DOCUMENTS

| | | |
|---|---|---|
| WO | WO 99/12101 | 3/1999 |
| WO | WO 00/65447 | 11/2000 |
| WO | WO 01/04801 A1 | 1/2001 |
| WO | WO 01/33357 A1 | 5/2001 |

OTHER PUBLICATIONS

International Search Report of PCT/US00/10999; Sep. 1, 2000.

Hultgren, C.D., "Fault–tolerant Personal Computers Safeguard Critical Applications," I&CS Instruments And Control Systems, vol. 65, No. 9, Radnor, PA, US, pp. 23–28, (Sep. 1992).

Robinson, J.T., Analysis Of Steady–State Segment Storage Utilizations In A Log–Structured File System With Least–Utilized.

Segment Cleaning, IBM Research Division, T.J. Watson Research Center, Oct., 1996, pp. 29–32.

Green R.J. et al., "Designing a Fast, On–line Backup System For A Log–Structured File System," Digital Technical Journal, vol. 8, No. 2, 1996, pp. 32–45.

* cited by examiner

METHOD, SOFTWARE AND APPARATUS FOR RECOVERING AND RECYCLING DATA IN CONJUNCTION WITH AN OPERATING SYSTEM

CROSS REFERENCE TO RELATED APPLICATIONS

The present application claims priority benefit of U.S. Provisional Application No. 60/158,336, entitled "METHOD, SOFTWARE AND APPARATUS FOR RECYCLING OVERWRITTEN DISK STORAGE IN CONJUNCTION WITH AN OPERATING SYSTEM ON WHICH A HISTORY OF CHANGES ARE BEING TRACKED," filed on Oct. 7, 1999, which is incorporated herein by reference.

This application is a continuation-in-part of U.S. application Ser. No. 09/450,266, filed Nov. 29, 1999, U.S. Pat. No. 6,240,527, entitled "METHOD, SOFTWARE AND APPARATUS FOR SAVING, USING AND RECOVERING DATA," which is a continuation of U.S. application Ser. No. 09/105,733, filed Jun. 26, 1998, U.S. Pat. No. 6,016,553, entitled "METHOD, SOFTWARE AND APPARATUS FOR SAVING, USING AND RECOVERING DATA," which is a continuation-in-part of U.S. application Ser. No. 09/039,650, filed Mar. 16, 1998, now abandoned, entitled "METHOD, SOFTWARE AND APPARATUS FOR SAVING, USING AND RECOVERING DATA," the entire disclosures of which are incorporated herein by reference.

COPYRIGHT NOTICE/PERMISSION

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. The following notice applies to the software and data as described below and in the drawing hereto: Copyright 0 1999, Wild File, Inc. All Rights Reserved.

BACKGROUND OF THE INVENTION

1. Field of the Invention

The present invention relates generally to the storage of digital data, and more particularly to method and apparatus for tracking changes made by an operating system (OS) for the files under its management within the context of a change tracking system that supports the backup and recovery of data stored by a digital computer

2. Description of the Related Art

Applications executing on computers typically operate under an operating system (OS) that has the responsibility, among other things, to save and recall information from a hard disk. The information is typically organized in files. The OS maintains a method of mapping between a file and the associated locations on a hard disk at which the file's information is kept.

Currently computers are generally operated in a manner where information (data) is read and written to a disk for permanent storage. Periodically a backup (copy) is typically made of the disk to address two types of problems: First, the disk itself physically fails making the information it had contained inaccessible. Second, if the information on disk changes and it is determined the original state was desired, a user uses the backup to recover this original state. Backups can be made to the same disk or to an alternate media (disk, tape drive, etc.).

Tape backup traditionally involves duplicating a disk's contents, either organized as files or a disk sector image, onto a magnetic tape. Such a tape is typically removable and therefore can be stored off-site to provide recovery due to a disk drive malfunction or even to an entire site (including the disk drive) being destroyed, for example, in a fire.

When information is copied from a disk to tape in the form of a sector level disk image (i.e., the information is organized on the tape in the same manner as on the disk), a restoration works most efficiently to an identical disk drive. The reason for such an organization is speed. Reading the disk sequentially from start to end is much faster than jumping around on the disk reading each file one at a time. This is because often a file is not stored continuously in one area of the disk, but may be spread out and intermixed with other files across the entire disk. When information is copied one file at a time to a tape it is possible to efficiently restore one or more files to a disk that may be both different and already containing data.

Tape backup focuses on backing up an entire disk or specific files at a given moment in time. Typically the process will take a long time and is thus done infrequently, such as during the evening. Incremental backups involve only saving data that has changed since the last backup, thus reducing the amount of tape and backup time required. However, a full system recovery requires that the initial full system backup and all subsequent incremental backups be read and combined in order to restore to the time of the last incremental backup. One key shortcoming of tape backup is that if a recent backup is not performed the information and work generated after the last backup may be lost.

Write-once optical disk backup as performed by a WORM drive has many of the same qualities as tape backup. However, because of the technology involved, it is not possible to overwrite data. Therefore it provides some measure of a legal "accounting" system for unalterable backups. WORM drives cannot provide continuous backup of changing disk information because eventually they will fill.

A RAID system is a collection of drives which collectively act as a single storage system, which can tolerate the failure of a drive without losing data, and which can operate independently of each other. The two key techniques involved in RAID are striping and mirroring. Striping has data split across drives, resulting in higher data throughput. Mirroring provides redundancy by duplicating all data from one drive on another drive. Generally, data is not lost if only one drive fails, since the other has another copy.

RAID systems are concerned with speed and data redundancy as a form of backup against physical drive failures. However, RAID systems do not address reverting back in time to retrieve information that has since changed;

The Tilios Operating System was developed several years ago, and provided for securing a disk's state and then allowing the user to continue on and modify it. The operating system maintained both the secured and current states. Logging of keystrokes was performed so that in the event of a crash, where the current state is lost or becomes invalid, the disk could easily revert to its secured state and the log replayed. This would recover all disk information up to the time of the crash by, for example, simulating a user editing a file. The secured disk image was always available along with the current so that information could be copied forward in time-i.e., information saved at the time of the securing backup could be copied to the current state.

The Tilios Operating System could perform a more rapid backup because all the work was performed on the disk (e.g., there was no transfer to tape) and techniques were used to take advantage of the incremental nature of change (i.e., the current and secured states typically only had minor differences). Nonetheless, the user was still faced with selecting specific times at which to secure (backup) and the replay method for keystrokes was not entirely reliable for recreating states subsequent to the backup. For example, the keystrokes may have been commands copying data from a floppy disk or the Internet, both of whose interactions are beyond the scope of the CPU and disk to recreate.

Simply creating a backup a file by making a copy of a file under a new name, typically changing only a file's extension (e.g., "abc.doc" is copied to "abc.bak") has been a long standing practice. In the event the main file (abc.doc) is corrupted or lost, one can restore from the backup (abc.bak). This process is much the same as doing a selective tape backup and carries the issues of managing the backups (when to make, when to discard, etc.).

In summary, a RAID system only deals with backup in the context of physical drive failures. Tape, WORM, Tilios, and file copies also address backup in the context of recovering changed (lost) information.

The traditional backup process involves stopping at a specific time and making a duplicate copy of the disk's information. This involves looking at the entire disk and making a copy such that the entire disk can be recreated or specific information recalled. This process typically involves writing to a tape. Alternatively, a user may backup a specific set of files by creating duplicates that represent frozen copies from a specific time. It is assumed the originals will go on to be altered. This process typically involves creating a backup file on the same disk drive with the original. Note that a "disk" may actually be one or more disk drives or devices acting in the manner of a disk drive.

In both of these cases the user must make a conscious decision to make a backup. In the second case a specific application, like a text editor, may keep the last few versions of a file (information). However, this can lead to wasted disk space as ultimately everything is duplicated long after files have stabilized. In other words, while working on a document a user may likely want to revert to a prior version, but once finished and years later, it is very unlikely the user would care to re-visit the last state before final.

Another situation where information recovery is very important is when the directory system for a disk, which identifies what and where files are located on disk, gets corrupted. This occurs, for example, due to a system crash during the directory's update or due to a bug in the operating system or other utility. In either case, losing the directory of a disk's contents results in losing the referenced files, even though they still exist on the disk. In this case the information the user wants to restore is the disk's directory.

A final example of why a user would want to revert to a backup is when the operating system gets corrupted due, for example, to installing new software or device drivers that don't work.

There are many reasons a user might want to go back in time in the context of information being manipulated on a computer's disk. Traditional backups offer recovery to the time of the backup. However, these system-wide backups are limited in frequency due to the amount of time required to scan the disk and duplicate its contents. In other words, it is not feasible to backup an entire disk every few minutes as this would require significant pauses in operation and an enormous amount of storage. Keeping historical copies of files as they progress in time has the drawback of eventually forcing the user to manage the archives and purge copies in order to avoid overflowing the disk.

The use of the technique of renaming a file in order to re-associate a file's data with another file is well-known to avoid the overhead of copying the data and deleting the old file. The act of renaming a file under an OS generally involves a re-association of a set of allocations from one file to another in the OS's file system. In a broad way, a file represents a collection of disk allocations and it is through the manipulation of these allocations in and between different files that storage is managed. For example, the free storage on a PC can be thought of itself as a file. When you create a file, storage is taken from the "free" file and re-associated with another file. The technique of deleting a file is by definition the method used under an OS to signal that the storage used to hold a file's data can now be returned to the general pool from which the OS allocates storage for newly created files. These concepts are well known those skilled in the art of OS design.

Another problem inherent in the prior art data backup applications is the need to control the order in which data is written to a disk. For example, when making a transition from one stable state to another, transitional data is written (flushed) out to the disk and then internal backup data needed by the data backup application the is updated. However, modern disk drives, in an attempt to improve their performance, currently include write caches. These write caches buffer up writes and commit the data to the disk media in a different order than written. This process speeds up the overall write process by allowing, for example, the disk controller to actually write data in an order that reduces the movement of the disk head. However, the internal backup data may be updated on disk before data that is assumed already present on disk (it is still waiting to be written). In the event of a power failure, the safe transitioning from one stable state to another is rendered useless.

There are commands that can be sent to disk drives to disable such write cache optimization. However, these also disable other useful optimization and thus there is a serious performance degradation. Some disks support the use of a flush command to specifically flush out the write cache, but these commands are not easily available. In other words, on a computer of today, there are standard means in the BIOS to reading and writing from a disk, but there is no standard means to flush the write cache. Thus, regardless of whether a computer's disk drive supports a flush command, since the data backup application uses the standard interfaces of the BIOS, there is no way for the data backup application to easily initiate flush. It would have to communicate directly to the disk and thus have specific hardware knowledge, which from the point of view of a general program that is expected to run on any computer is not possible. The computer manufacturer generally has married a specific type of hard disk with a BIOS that knows how to control this type of disk. All software that follows generally relies on the interfaces provided by the BIOS to talk to the disk—be it SCSI, IDE, or other—and the interface today does not include a flush command.

Therefore, without attempting to build in specialized disk (hardware) knowledge into the engine, an improved backup method would facilitate the presence of a write cache without requiring a method of flushing it. This implies the method must take into account that data written to a disk controller may be actually committed to the disk media in a different order, and notwithstanding, the method should maintain data integrity on the disk to allowing for crash recovery.

In view of the forgoing, there is a need for improved methods of recovering data. The methods should allow reconstruction of prior states of a computer disk in a safe and chronologically controlled manner.

SUMMARY OF THE INVENTION

Broadly speaking, the present invention fills these needs by providing a method for reconstructing a prior state of a computer disk using both the current status of the disk and historical data. The present invention combines sector level backups with file level backups to increase both efficiency and reliability.

In one embodiment a method for recovering data is disclosed. Initially a record of historic states of a disk is created, wherein the disk includes various disk locations, such as a disk location X, a disk location Y, and a disk location Z. In response to a request to overwrite original data at the disk location X with new data, the new data is stored at the disk location Y. Then, an indication is established in the record of historic states that indicates the roles of disk location X and Y. These roles could establish the role of disk location X as including historic data, and the role of location Y as including new data for location X. In addition, the method includes intercepting a command to release data at the disk location Z, and establishing an indication in the record of historic states indicating that disk location Z includes historic data.

In another embodiment, a computer program for restoring a prior state of a computer disk is disclosed. The computer program includes a code segment capable of intercepting file management commands from an operating system, and a map that indicates a status of disk locations. Further, the computer program includes a history table that maps historical data to a main area. The history table also indicates disk locations that have been released by, the operating system. Each of the entries in the history table can be accessed in chronological order. The computer program further includes a code segment that records indications of disk changes in the history table in substantially chronological order.

In yet a further embodiment, a method is disclosed for restoring a prior state of a computer readable media. Initially, a data structure having entries for historic changes to the computer readable media is established. The data structure includes a write entry relating to an overwrite of original data at a first data location X with new data, and a release entry that relates to a release of a data location Z by an operating system. Then, a most recent entry in the data structure is examined in response to a request to reconstruct the computer readable media. In response to examining the write entry, the new data at first data location X is replaced with the original data. Further, in response to examining the release entry, the operating system is allowed to access the released data location Z. The most recent entry in the data structure is then discarded, and the method is repeated until the prior state of the computer readable media is restored.

It will become apparent to those skilled in the art that the present invention advantageously allows reconstruction of prior states of a computer disk in a manner that is safe and chronologically controlled. Other aspects and advantages of the invention will become apparent from the following detailed description, taken in conjunction with the accompanying drawings, illustrating by way of example the principles of the invention.

BRIEF DESCRIPTION OF THE DRAWINGS

The invention, together with further advantages thereof, may best be understood by reference to the following description taken in conjunction with the accompanying drawings in which.

DETAILED DESCRIPTION OF THE PREFERRED EMBODIMENTS

Figure 1:
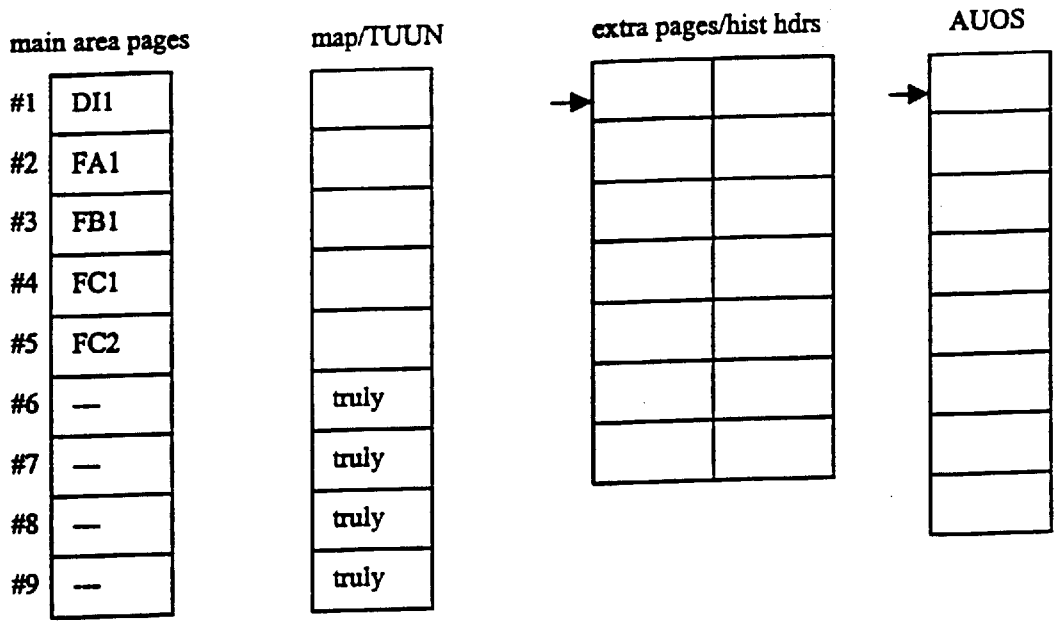
FIG. 1 is block diagram showing an exemplary initial system state, in accordance with an embodiment of the present invention.

An invention is disclosed for recycling overwritten disk storage in conjunction with an operating system on which a history of changes is being tracked. The present invention allows the operating system select actual storage locations to write data to, while ensuring that old historic data that is required to recreate a prior state of the disk is protected from the operating system. In addition, the present invention supports de-fragmentation processes and safe data transition to the actual disk media.

In the following description, numerous specific details are set forth in order to provide a thorough understanding of the present invention. It will be apparent, however, to one skilled in the art that the present invention may be practiced without some or all of these specific details. In other instances, well known process steps have not been described in detail in order not to unnecessarily obscure the present invention. Further, the previously described patent applications, namely, U.S. application Ser. No. 09/450,266, U.S. application Ser. No. 09/105,733, and U.S. application Ser. No. 09/039,650, which are each incorporated by reference, will be hereinafter referred to as "the prior patent applications."

To further clarify the following discussion, specific terms will now be described, namely, the current disk image, the simulated disk image, the main area, and the extra page area. The current disk image refers to the non-historic view of the disk. It consists of the data last written by the user. If no historic logging was in place on a disk, its current image is the data the disk now contains. The simulated disk is to the user and OS a completely independent disk. However, the engine at a level below the OS creates this disk on the fly from the current image and saved historic data.

The actual hard disk is generally divided into two basic areas consisting of main and extra pages. The main area holds the pages belonging to the current image. In the extra page area the historic data is kept. The main area map re-routes accesses to the current image to possible alternate locations assigned by the engine. Historic page descriptors in the history map manage the historic pages. Main and extra pages can temporarily swap roles, either within their own areas, or with pages from the opposite area. Therefore, part of the current image may for a moment be mapped to a page belonging to the extra page area, which normally holds historic data.

The expression "overwritten data" should also be carefully understood. Overwritten data does not refer to data that has been physically overwritten. A file includes data that may be overwritten by an application. However, the present invention is concerned with saving the data's original state. This is accomplished by either copying (moving) the data before it is physically overwritten, or re-directing the write and thus avoiding a true overwrite. Thus the expression is referring to the file's data that existed prior to the OS overwriting it, and which is now being preserved as historic data by the engine.

Disk management responsibilities may be segregated out of an operating system into a filing system (e.g., NTFS in Windows NT). For the purposes of this document, when referring to the OS, the reference includes any other subsystems involved with disk management.

The term engine refers to the logic implementing the method currently under discussion. Various methods are discussed and each has its own engine.

The word "extra" in the term 'extra page area' is conceptually founded in the idea that what is not visible to a user is extra. A disk physically has a given capacity. However, some of this disk is set aside and hidden from the user. Thus the user-visible disk size (main area), which is that reported by the OS, is less than its true size. The storage that is not visible to the user is "extra," which the engine utilizes.

The OS assigns disk locations to various structures under its control (e.g., files). However, because some the engines re-map the OS's disk locations to other locations, in order to distinguish between the use of "disk locations" in the context of the OS and the engine, the OS disk locations are called location keys.

The prior patent applications identified above describe three methods of preserving the original states of overwritten data: the Temp, Always, and File methods. In the Temp and Always methods the mechanisms (engine) that protect the original state of a disk at a given time from the operating system (OS) and applications (e.g., games) are isolated. Note that the protected "state" is that viewed by the OS through the engine, noting the engine may re-map and otherwise manage the OS's assignments of data to associated disk locations. Such isolation improves reliability because the protection mechanisms are not subject to bugs or otherwise undesired disk write behavior in the OS.

Isolation of the engine also allows the mechanisms to be migrated into the hardware. As already discussed, the migration to hardware can involve incorporating protecting elements (logic) into, for example, the CPU, disk interface, and/or hard disk controller.

It is generally desirable to closely coordinate the OS's process of allocating and releasing storage with that of the engine to reduce or eliminate redundant or extra steps. Such extra steps (overhead) are introduced because of the desire to isolate the engine from the OS. In other words, the engine assumes a non-trusted relationship with the OS—it assumes the OS may act to corrupt any data it can access. The Temp method seeks to maintain the OS's organization of data on disk, and so there is relatively little coordination required between the OS and the engine regarding the assignment of data to actual disk locations.

The Always method uses a closer relationship involving providing de-allocation information to the engine. With this and other information, an engine implementing the Always method generally avoids having to move data in order to preserve or optimize the original contents of a given disk location (file). In other words, when the OS writes new data, the location initially assigned on disk is reasonably permanent (as compared to the Temp method).

Implementing the key methods of protecting original states by incorporating them directly in the OS was contemplated by the File method. The prior patent applications address how to allow a disk de-fragmentation process (the re-arranging of data on disk to optimize access by the OS) to be controlled by a non-trusted algorithm while at the same time insuring that the engine can protect the original states. The prior applications also addressed how to safely transition changes to a disk that has a write-back cache.

The present invention details a variant of the Temp, Always, and File methods whereby the OS plays a greater role in selecting the actual storage locations to which data is written. However, at the same time the present invention insures that old historic data required to recreate a prior state of the disk is protected from the OS. Thus, part of the logic of the engine is handled by more or less standard operations or augmented operations to the operating system. The present invention also builds upon the prior applications to support a de-fragmentation process and the safe transition of data to the disk's actual media.

The methods of the present invention are based on an exchange of allocation and de-allocation information between the OS and the engine, as generally contemplated in the prior patent applications. However, specific methods are detailed in the present invention whereby the OS's mechanisms for re-associating storage from one file to another (file renaming) and releasing storage (file deletion) are combined with methods to insure that such operations are not harmful to the engine's restorative ability.

In general, the present invention allows the OS to make what will at least eventually be the final location on disk for its data. Thus the file system, at least eventually, will directly map files to disk locations where the engine has actually placed the data, thus no re-mapping is necessary.

One embodiment of the present invention will be referred to as the ATF method (Always, Temp, and File methods combined). The ATF method reduces the amount of data that must be swapped by allowing the OS to pick final disk locations for much of the new data such that swapping is not required. The method also separates out the de-fragmentation process so that the OS or another utility can perform the operation, using the provided interface into the engine.

The present invention adds an interface between the OS and the engine (ATF method) such that the engine is initially informed of the OS disk locations that are unassigned ("truly unused"). The rule is made that by informing the engine that certain locations are truly unused, the engine can effectively force these locations to zero. Note, however, that the engine may in fact store data in these locations but if the OS attempts to read any such location, the engine returns zero data. This later step protects the OS from accessing storage that is used for internal purposes by the engine, including historic data (thus providing a level of security to that data).

When the OS writes to disk locations that are in use, as according to the Temp method, the engine re-directs the writes and then eventually swaps the new and historic data. As the operating system flags storage as truly unused (which will be discussed more shortly), the indicated pages may be at least effectively zeroed (for security). If the OS writes to locations that have been flagged as truly unused, the data is written directly into place by the engine. Therefore, the engine maintains a map indicating the locations that have been flagged by the OS as truly unused.

The ATF method then picks up from the File method where the transition of OS disk locations from containing active (main area) data to historic (extra page) data is moved into the OS or an extended OS. An extended OS is one that combines a standard OS with supplemental code to implement the operations required by the engine, should they not already be in the OS. Basically, as storage is released by the operating system, it goes into an "almost unused" state. This is different from being "truly unused" in that although the storage is officially released by the operating system, it's contents are being kept for possible use in recovering prior states, and moves through an aging process from being almost unused to truly unused. In other words, almost unused storage is simply old historic data. Such storage is referred to in the context of the engine as historic data (disk locations that have been overwritten by the OS and are being preserved by the engine). In the present invention, as the OS is now aware of this storage, it is referred to in the context of the OS as almost unused storage.

In the normal course of using an OS the disk and files are changed in many ways. Parts of a file can be overwritten (e.g., a few bytes in the middle). A new file can be created or a file can be deleted. An existing file's contents can be discarded and replaced with new data (a combination of delete and create) or a file can be truncated (all data after a certain point in the file is discarded). There are many types of-operations that can be supported by the OS. Disk data that is outside the context of a user visible file is typically involved in the OS's management of the files. For example, tables associating specific disk locations to specific files. Such information, as already mentioned, can at least in concept be thought of as special internal OS files. One task of the present invention is to provide the way for recreating the contents of the disk (as viewed by the OS) at an earlier time.

The ATF method handles the preservation of general changes to the disk using a method similar to the Temp method. However, the ATF method also provides for the OS informing it of storage that has been "deleted," or in other words, storage who contents are no longer required but should be tracked by the engine for possible use in recovery.

There are two operations that can generally be easily intercepted and adjusted to catch at least some of the de-allocations: the file delete and file discard and replace contents operations. In both cases, by converting the operation into at least in part, for example, a file rename, the released storage is preserved. It is not only saved, but as a block of storage, continues to be mapped out of the OS's normal free (available) disk storage tracking, and thus will not be re-used.

There are many operations such as the modification (overwriting) of the middle of an arbitrary file for which the file rename technique (or equivalent) does not handle. Further, there is the modification of the OS's internal data. The ATF method provides for coordination with the OS on certain de-allocation operations for the purposes of tracking original states, but then uses the Temp method to handle everything else that is not otherwise covered. The present invention details specifics that allow for the reduction of swapping, preserves of the OS role in generally assigning at least the eventual disk locations for storage, and provides for the protection of the overall restorative ability through isolation (e.g., a firewall).

In the ATF method, when the OS releases a block of storage, instead of being returned to the free pool, it is labeled, classified as almost unused, and the engine is informed of the release. In practice, this may be done by extending a standard OS to rename files when a file's storage is about to be released. The engine is informed of the disk allocations associated with the almost unused storage so that the engine may now protect against any further alerting of the storage. The protection may takes the form of allowing the almost unused storage to be modified by the OS, but the engine will take steps to track the original state of the almost unused storage. In other words, the Temp method is being implemented but the engine is also informed of the locations of the almost unused storage (as well as how they are labeled by the OS).

Advantageously, the operations outlined above result in the OS generally not re-using the almost unused storage as, in the OS's view, it has been set aside. This means that if the OS does not overwrite the almost unused storage, the Temp method will not have to re-direct and later swap new and prior states.

As the almost unused storage is aged along with the general historic data in the engine, it transitions to truly unused storage. This is done generally under the engine's control. This process follows the general outline of the Always method. In the Always method, blocks of storage went from being part of the main OS image (MAIN block) to being historic data (EXTR block) to being available to receive new data (CTMA block). In the ATF method, in addition to the general Temp method mechanisms, blocks of storage transition from being associated with files, to being associated with almost unused storage (that is preserving historic data), to being available again to re-use (in the free disk pool). In the ATF method the "blocks" are generally entire files that are released. The Always method included a degree of built in de-fragmentation whereas the ATF method relegates de-fragmentation to more of an external process (i.e., the ATF method allows the OS or a utility to direct the re-arranging of the disk's storage).

It is an interesting note about "block" size in that under the ATF method, if the blocks of almost unused storage are associated with files, the size of the blocks can vary dramatically. In other words, the user may have deleted a huge file or a little one. Thus as almost unused storage transitions to being truly unused, the amount of storage returned to the OS's free pool may be in large chunks. At first it might seem somehow better to more gradually transition storage tracking historic data back into the OS's free pool, therefore seemingly not releasing historic data before it is really needed.

However, if the blocks do correspond to what were files, from the point of view of restoring data, it makes no sense to hold back half a historic file's contents while at the same time allowing the other half to be re-used. Therefore, there is no problem in returning large blocks of storage to the OS's free pool, thus giving up their prior role of tracking old historic data, as long as the entire block of old historic data is required in order to be useful. This same general observation was made with regard to the Always method in that storage used to track historic data could be released in blocks corresponding to safe points. This is because it was observed that a partial set of historic data for a given safe point is not usable for any recovery purposes.

Details of the ATF method are presented in two steps. The first step builds upon the New Temp method, and is intended to illustrate a progression from the New Temp method as well as highlight certain issues. Later, the ATF method using a different implementation is presented in a second step that resolves the issues in the first step's design, but is more a jump from the data structures of the previous methods.

The prior patent applications described a New Temp method whereby the engine maintained a relatively simple data structure of history headers corresponding to extra pages, in addition to the main area pages that were generally accessible by the OS. The ATF method adds two additional data structures. A circular table of the blocks of almost unused OS locations (AUOS) in chronological order and a map indicating what main area pages are truly unused or almost unused (TUUN). For each block in the AUOS table, the method by which the block is identified in the OS is stored (e.g., a file name). Also stored is a link into the history headers indicating when the block was created, thus linking the block into the overall time tracking mechanisms of the history headers. An exemplary AUOS Table Entry is outlined in table 1.

TABLE 1

OS label (e.g., temp file name)
Reference point in history header table
Number of disk locations
| disk location #1 | effectively released storage by the OS, |
| : | pending actual de-allocation and re-use by |
| disk location #n | OS |

As the OS transitions storage from being activity associated with a files to being almost unused, blocks are added to one end of the AUOS table and the TUUN map updated to indicate the new disk locations that are now in an almost unused state. As needed to maintain a sufficient amount of free space available to the OS, blocks are taken from the other end of the table. The associated storage is made available for re-use by the OS and the TUUN map updated (the disk locations that were almost unused are now truly unused). If the OS had used its rename operation to set aside historic data, it would now typically used its delete operation to actually make the storage available for its own re-use. It is the TUUN status indicating a disk location is truly unused that allows the engine to avoid its normal divert and swap process.

The TUUN map tracks the almost unused status of disk locations to allow the engine to catch OS read requests to such storage and return zero data instead of the actual contents. There are two reasons to do this. First, as almost unused storage contains historic data, there is the general issue of security. A user may not want it to be easy to access a prior state of his/her disk. Security could be implemented either by the engine intercepting such access, as just proposed, or by using OS security mechanisms (locking the file from access, setting the file's attribute bits, etc.). However, it should be noted that an overall purpose of the engine is to insure the user can access prior states of their disk.

This security issue is a secondary concern. However, of primary concern is the concept of insuring access to a disk's prior state. The problem with allowing the user (OS) to access historic data as if it were simply part of the normal disk image, is that the historic data then becomes part of the main image. Therefore, an application running on the OS may make use of this data and therefore more easily become dependent on it. If this happens, and the data is released as part of the normal aging process, it will not be possible to revert the entire disk back in time. In other words, if the OS can directly see historic data, the concept of going back in time is weakened.

The mechanisms provided by the engine generally clearly separate historic data from the main image: you access a prior state through a virtual drive, not the main drive, and you access (retrieve) overwritten or deleted versions of files through special applications. Therefore, the separation between historic data and the current disk's main image is reasonably established. Note that it would be acceptable to allow a special application to directly access historic data by way of renamed files that are holding almost unused data. This requires coordination with the engine (or OS) to defeat its normal protection (e.g., zeroing) of the data.

The important point is that an application is not simply accessing a "normal" file as managed and available to the user by the OS, but that a special application is required in order to "extract" the file (data) from the engine/OS's historic tracking.

There is, however, a very important reason to have the engine generally zero the data returned when the OS reads disk locations that have been flagged as almost unused. The reason lies in the preceding arguments why it is important that there is a clear distinction between the main image and historic data. As historic data is allowed to intermix with the main image, there can evolve subtle interdependencies, and thus when historic data is actually released any interdependencies are broken. Keep in mind that the release of historic data is permanent and irreversible. The reason for tracking historic data is to by definition provide to the user a degree of reversibility—i.e., they can for some period of time get some of their data back. When the user becomes more involved with irreversible operations, part of the goal of the engine is diluted.

The following example illustrates one important reason to return zeros (or otherwise hide) historic data from general access by the OS in the context of the main image: The user intentionally or unintentionally clicks OK to some dialog that permanently erases massive amounts of data. It is this very situation from which the engine is supposed to offer a degree of recoverability. If the historic tracking system is implemented on top of the OS, then some operation or bug that results in the OS losing the files that contain the historic data would be catastrophic.

However, the ATF method has generally isolated itself from the complexities of the OS. Now consider the case that the user clicked OK to a program (or virus) that signaled to the engine that massive amounts of disk storage are almost unused. However, this communication was not made to the OS and so the affected storage is still accessible by the OS. If the OS accesses the data and the engine does not zero it, then from the user's point of view, the disk's contents appear to be fine. However, the user is unknowingly accessing historic data, at least from the engine's point of view, as part of the main image. At some future point the engine releases and reuses this historic data and suddenly, and irreversibly, what had been the disk's main image changes. Further, using the engine to revert back in time does not re-create the main image as viewed by the user and OS.

If, on the other hand, historic data is generally forced to zero when read by the OS, the main image is consistent and fully restored when reverting back in time. Interdependencies between historic and main image data are reasonably avoided. Thus, in the preceding scenario, when the user clicks OK and much of their data is flagged as almost unused (historic), it effectively is set to zero. Thus, the user is likely to immediately experience the actual results of his/her action, and be provided the ability to back out of the action by the engine. In other words, it is very important that the user through the main disk actually experience the "loss" of data in order to have an opportunity to retrieve it through the historic aging process provided by the engine.

Therefore, it is recommended that the act of the OS informing the engine of almost unused storage implies the effective zeroing of the data by the engine should the OS later attempt to read it. It should be noted that the historic contents of the almost unused storage are not actually set to zero. Through special applications it is acceptable and it is the method by which historic data is accessed.

For example, the applications reconstruct prior states of the disk and/or retrieving specific files by utilizing the data managed by the engine and OS. This scenario includes retrieving a specific file by simply allowing access through the special application to the actual non-zeroed contents of a file that is being used to preserve storage as almost unused. Specifically, this method of accessing a prior state of a specific file involves allowing access to the contents of the file that is holding this state, as managed by the OS. This generally differs and is a shortcut from the approach of effectively reconstructing the entire disk as a virtual drive from which the desired file is retrieved. This shortcut generally should not be taken if the engine has detected that the OS has unexpectedly overwritten almost unused storage—i.e., the OS has corrupted its own historic tracking. However, the engine will still through the Temp method be able to provide access to prior disk states.

Note that the OS may, not want or be able to immediately inform the engine of almost unused storage. It may choose to collect up the storage as it is released by the application and later pass along the associated disk locations and other information to the engine.

Table 2 below generally outlines the associated processes of the OS and engine.

TABLE 2

| OS Action | Engine Action |
|---|---|
| OS writes to truly unused locations. | Engine directly writes data to disk. TUUN map is updated to indicate location is now of main area type (no longer truly unused). |
| OS writes to almost unused or main area locations. | Engine re-directs writes and establishes a mapping. |
| OS reads almost unused or truly unused locations. | Engine returns zeros. |
| OS desires to release storage, it labels it, sets it aside as almost unused storage (e.g., renames it), and informs the engine. | Engine records locations of almost unused storage (AUOS), its OS label, and updates the status of the locations (TUUN) map. Entries are added to the top of the circular AUOS table. |
| OS requires some storage that is currently being used by the engine to track historic data to be returned to it for use in new allocations. It requests engine for its OS label of the next "block" to recapture. The block is then returned to the OS's free storage pool (e.g., the file representing or mapping out the historic data is actually deleted). | Engine reads from the bottom of the circular AUOS table and supplies back to the OS the next OS label to de-allocate. It updates its TUUN map to reflect that the almost unused storage is now truly unused. |

One of the elegant aspects of the ATF method is that generally no harm is done if the OS and engine get out of sync with regard to the tracking of almost and truly unused storage. Table 3 and table 4 below outline the various out of sync conditions and the results. Note that the expression of "losing" information implies only that somehow the information is never successfully transferred between the OS and engine. This includes the cases where the information is not ever transferred as well as it is, but then is lost as part of an incomplete flush of state/data to disk (crash).

OS to Engine Informing of Almost Unused Storage

TABLE 3

| The OS flags disk locations as almost unused but the engine loses this status. | Eventually the OS will see that the engine is not tracking a block of storage it has set aside as almost unused. In other words, assuming the OS utilizes a sequential labeling scheme, out of sync conditions can easily be detected. In such case, the block can simply be re-submitted as being almost unused. Without re-synchronization, the effect of the engine losing track of a block of almost unused storage, while at the same time the OS has set it aside, the storage will remain set aside by the OS and therefore the total available storage to the user is reduced. The OS does re-synchronization by reading back the AUOS table from the engine. Note that normally the OS should not be reading (or writing) to locations it has flagged as almost unused. It a read does occur in this condition the associated "historic" data is returned (not zeroed). |
| The OS flags disk locations as almost unused, informs the engine, but then the OS loses the transition. Thus, the OS considers some locations as either part of active files or truly unused when the engine has classified the locations as almost unused. | From the viewpoint of when the engine ages out the block and informs the OS that it is now truly unused storage, the OS will not have a record of the block. It can simply ignore the update. If during the time when the OS and engine are out of sync, the OS reads the affected locations, the data is returned as zero. This is because informing the engine of almost unused storage implies a "zero the data" operation. Thus, this sequence is the same as the OS writing zeros to the data without proper synchronization with its own state. If during the time when the OS and engine are out of sync, the OS writes to the affected locations, the data is diverted and the engine re-maps the changes. Thus, the engine forces a transition out of almost used to main area. THIS IMPLIES THAT WHEN THE ENGINE IS PROCESSING AUOS ENTRIES and making the transition from almost unused to truly unused some special logic is required. If an entry is not currently flagged as almost unused in the TUUN map (as expected) then its state is not altered (i.e., an unexpected write has occurred whose change is to be left intact). |

The Engine to OS Informing of Truly Unused Storage

TABLE 4

| The engine informs the OS of an OS labeled block of almost unused storage that should now be returned to the OS's general new allocation pool (free list). However, the OS has no record of such a block. | The OS simply ignore the request. When the OS originally informed the engine of the affected disk locations, this was equivalent to the OS zeroing out the data. It is possible that after the request was made the computer crashed and although the engine recorded the transition to almost unused, the OS lost its record. In this case the OS may still link to the affected storage under an active file. If the file is read, zero data is returned. If the file is written, the engine will properly accept the changes. |
| The engine will never inform the OS that an OS labeled block of almost unused storage that it has set aside is ready to be returned to the OS's allocation pool because somehow although the OS has set aside the storage, the engine has lost the transition. | This condition is where the OS, from the viewpoint of the engine, has apparently decided not to modify a certain part of the disk. It is up to the OS at some point to realize the engine does not have a certain block in its circular tracking system (AUOS table) and take appropriate action (like re-submitting it). The OS can periodically check for this state and/or check for it as the engine informs it of other blocks making the transition from almost to truly unused. |

Table 5 and table 6 below outline the three states in which storage can be classified and how they transition from one state to another.

TABLE 5

| Main | main | NA |
|---|---|---|
| | almost unused | The OS submits a request to the engine. AUOS tracks. |
| | truly unused | This transition is not possible. |
| almost unused | main | This transition is not normal, but occurs when the OS writes to data that the engine has classified as almost unused. STTU tracks. |
| | almost unused | NA |
| | truly unused | The engine initiates this transition as historic data is aged out of the circular tracking system. STTU tracks. |
| truly unused | main | The OS allocates and writes to previously truly unused storage. |
| | almost unused | This transition is only possible in the event the OS and engine are out of sync. In this case, the affected storage should be considered as part of the active main image (though its contents will have been effectively zero). Thus the transition should be handled above under main to almost unused scenario. AUOS tracks. |
| | truly unused | NA |

OS Read/Write Access

TABLE 6

| | | |
|---|---|---|
| main | if read, direct or mapped data returned | if write, data diverted and mapping established |
| almost unused | if read, zero data returned | if write, data diverted and mapping established |
| truly unused | if read, zero data returned | if write, data directly written (no diversion) |

The TUUN map can be implemented as part of the main area map. In other words, as the OS accesses the disk, the specified locations are not only run through the main area map to see if there is a pending re-direction, but also to see if almost or truly unused storage is being accessed. However, since the main area map can be lost and then require reconstruction, reconstruction of the TUUN map would also be required. Since this ATF design will be re-addressed shortly (in the second step), the issue of reconstructing the TUUN map is ignored for the moment. However, note that a recent loss of information resulting in the incorrect classification of locations as NOT truly unused when in fact they are, is generally harmless, resulting in a write being diverted when such was not required.

What is generally not allowed to happen is for the user (OS) to be able to write to a truly unused location LL some data DD, which normally causes this location to transition out of being truly unused, but due to some type of failure, the transition is lost. An undesirable situation may occur if the contents of LL is allowed to change to DD, and the OS is allowed to read this new value, but at the same time the engine still has the location flagged as being truly unused. The problem is that the user may come to rely on the presence of this new data DD (it is an important file) but later if the OS again writes to location LL, the engine will allow the write directly through—thus the data DD is overwritten and permanently lost. One solution, as already argued, is to force zero data to be returned for all locations flagged as truly unused by the engine. Thus, in this case, when the truly unused status is lost, the data DD is also lost, and thus the user will not be mislead into believing the data is present and secure (tracked if overwritten).

It is not expected that the engine will randomly lose truly unused to main area status, but that the tail end of a series of writes may be discarded in the event of a crash. In other words, some truly unused locations are overwritten with new data, but before the TUUN map is updated on disk, the computer crashes and the engine restores itself to a stable but pre-TUUN map update state. Therefore, although the new data made it to the disk, the engine did not have time to record the transition and so the computer is restored to as if the new data had not make it to the disk.

The TUUN map is preferably implemented as a bit map because the almost and truly unused status bits will be in flux (changing) over a wide range of disk locations. Initially when a computer arrives from a factory, much of the disk is truly unused. However, as data is loaded and updated, large numbers of these bits over a generally wide range of locations will change. Therefore the map is likely not sparse. Regarding the safe transition from one state to another, and the fault tolerance of the TUUN map, it is recommended that some form of circular table be added. As truly unused locations are overwritten and become main area locations, the TUUN map is updated and a corresponding entry is added to this new circular table. Additions to the new circular table are flushed to disk relatively quickly after any updates, along with the AUOS table. On the other hand, the TUUN map is only flushed on system shutdown as it is assumed it can be reconstructed in the event of a crash. This avoids the frequent flushing of what generally will be many updated and cached TUUN map pages.

As mentioned previously, modern disk drives, in an attempt to improve their performance, currently include write caches. These write caches buffer up writes and commit the data to the disk media in a different order than written. This process speeds up the overall write process by allowing, for example, the disk controller to actually write data in an order that reduces the movement of the disk head. However, the internal backup data, such as the TUUN map and historic headers data, may be updated on disk before data that is assumed already present on disk (it is still waiting to be written). In the event of a power failure, the safe transitioning from one stable state to another is rendered useless.

Assuming the engine does not have the ability to control flushing of the write cache, the cache poses a difficult problem in the event of a crash. For example, a power failure likely will cause part of the write cache never to be written to disk. The problem for the engine is that some of its data may have been written to disk, and other parts not; but due to the write cache, the order in which data was written by the engine may not correlate to that which made it to the disk. Thus, if the engine writes to disk locations one, two, and three, and then crashes, it is possible locations one and three have been updated but not two.

Since there are few data structures that are fully useful when parts are missing, the present invention uses time aging as a means of insuring the integrity of data written to disk. It is generally assumed that a write cache algorithm will not hold off committing its data to disk for an unlimited amount of time. It is assumed this is true even in situations of constant read and write activity. If this was not the case, then it is conceivable that a file written in the morning would not make it to the disk media even hours later, because the data is stuck in the write cache awaiting an "optimal" time to be written. The present invention builds upon the assumption that upon writing a page to the disk controller, after some minimum amount of time has passed (wait time), it really will be written to the disk media (and so have been saved to non-volatile storage in the event of a crash).

Thus, the present invention uses time aging of data, where if and only if the data has been written to the disk controller at least wait time seconds in the past, the data is trusted in the context of a recovery (system restart). Some form of timestamp or time marker can be included with a block of data that is written to the disk controller, where a block is made up of multiple disk pages. The block is assumed to have been actually been transferred in its entirety to the disk media if a subsequent timestamp or time marker is found that was written at least wait time seconds later. A timestamp is a value that directly corresponds to a reading of a clock. By comparing two timestamps, it is possible to determine the length of the represented time interval. On the other hand, a time marker simply indicates that wait time seconds have passed since the prior time marker.

Watching the amount of data that has been transferred to the disk controller can be used to approximate a wait time. Since the transfer rate to the disk controller is known, multiplying this by the wait time yields the amount of data that should be transferred after the write of a given page in order to insure this page has really been written to disk media. This assumes continuous transfers are done.

The assumption that after an appropriate wait time data previously written will actually make it to the disk may not hold for certain disk controllers. In such a case an alternate method is used. Here, the engine insures that there has been a sufficient amount of "free time" since a given write for the disk controller to flush its write cache to disk. The engine can monitor the average number of transfers to the disk controller. This is compared to the known or estimated maximum transfer rate (reflecting the rate at which data can actually be read or written to the disk media) to determine if it is reasonable to expect the write cache to have been flushed. If a flush is required, and an insufficient amount of free time has passed, the engine can simply insert a delay (or a series of short delays to avoid a sudden pause in disk activity). The worst case transfer rate of the drive can be inferred from a timing calibration program that reads and writes very large blocks of data (much more than any reasonable cache size). Note that calculations would have to take into account the number of transfers, their relative proximity, and their size, as each independently contributes to the overall transfer rate. In other words, there is a time overhead to physically moving a disk head associated with the start of each transfer and a certain amount of time spent actually transferring the data to the disk's media.

An analogy to the free time method of flushing a disk controller's cache is to imagine the cache as a bucket in which cups of water are added. The bucket has a hole in its bottom that allows it drain at a fixed rate. The water flowing out of the hole is equivalent to the disk controller writing data to the disk media. The process of adding cups of water is equivalent to writing data to the disk controller. If the bucket is full, then you have wait. Reading data from the disk controller is equivalent to momentarily plugging the hole—nothing drains, nothing is added, but time simply passes (it is assumed that a read cache is independent of a write cache). Now, the situation of flushing a write cache is much like needing from time to time insure that a given cup of water that has been added to the bucket has drained, but you cannot actually look inside the bucket or detect if water is still draining. Further, when you add a cup of water to the bucket it gets mixed in with those cups previously as well as those that are subsequently added.

The only way to really know that the cup of water in question has really drained is to insure that at some point after adding the cup, the bucket has completely drained for a moment. Determining when, or how to create this event is the challenge, since you cannot see inside the bucket or know if it is still draining. In other words, there is no current standard interface to ask a disk controller if its cache has been flushed. One solution is to determine the worst case rate at which water drains from the bucket. This is done by a test in which you add cups of water as fast as possible until you are forced to wait, since the bucket has become full. After this point, you continue to add cups as the bucket empties (and will accept another cup) and you measure the rate. This process has effectively defeated the "buffering" effect of the bucket and you are now measuring the actual drain rate (or rate at which the disk controller can empty its cache).

With the knowledge of the rate at which the bucket drains, you can monitor the rate at which you add cups of water. When you add a cup that you wish to insure has been drained, you need to slow the rate of future additions such that the bucket is draining faster than you are adding new cups. At some point that can be calculated, the bucket will completely drain, notwithstanding the fact that you are continuing to add cups, be it slowly. Of course, if you need to relatively immediately insure the bucket has drained before adding even one more cup, you can simply wait the calculated time it takes to drain the bucket. In fact, by continuously monitoring the rate of additions to the bucket, one can even have some sense of how full the bucket was at the time of adding the cup that need to be drained. This allows you to reduce the delay. Of course, in this environment of approximation, plenty of fudge must be added (e.g., if you think it takes one second to completely drain, then you wait two seconds to cover for any slight error in calculations).

This water bucket analogy represents the free time method of flushing a write cache. Note that the rate at which the bucket empties is equivalent to how fast the write cache is flushed, which is a function of the seek time and transfer rates. Therefore the disk proximity of the data in the write cache—the locations of where it should all be written on disk—greatly impacts the time it takes to flush the cache. In other words, to write a lot of data to one region on the disk media takes far less time then writing small bits of data across the entire media. However, it is the latter case that can be timed and used as a worst case flush rate, acknowledging that the actual rate in general will be much better. Since one cannot guess what data is written first from the cache by a disk controller, it is not possible to monitor the page locations written to the disk controller and estimate the seek time to transfer time ratio, and thereby dynamically generate an estimated current flush rate.

Returning to the issue of the disk controller, the next question is when, generally, would a delay be inserted to insure the write cache is flushed. There is the process of diverting writes. In general, the user can only select points in time to access at which there was a lull in disk activity (safe point). This avoids accessing data from the past that was in the process of being modified. Thus as long as the lull is sufficiently long, the flushing of the write cache is inherent in the identification of safe points. When restarting a computer after a crash, the user has the option of reverting to a prior time, which will be a safe point, or simply using the disk in the state just prior to the crash. In the later case, the engine is recovering its data structures to a point in time where there may not have been a lull in disk activity. In other words, the crash occurred in the middle of a long sequence of disk activity. If the wait time based flushing method is used, all data written up to wait time seconds before the crash will be present. However, if the disk controller cannot be trusted to actually write data to the disk media after wait time seconds, then the engine has no recourse but to discard all data written prior to the last recorded flush time marker in disk activity. In other words, as the engine determines that a sufficient amount of free time has passed to insure a block of data will have actually been transferred to the disk media, the engine writes out an appropriate time marker. Once this marker has made it to the disk media, the block's validity is established. On recovering from a crash, data that was written to the media but for which no subsequent time marker was found is discarded as parts of the data may be missing. In practice, a user is generally not interested in data that was in the process of or had just been written out at the time of a crash, and so discarding of this data is not a problem.

Another type of engine activity that requires flushing is when the contents of the disk are being rearranged (swapped). This process involves distinct transfer steps that are assumed, at specific points in time, to be flushed to the disk in order to make the process crash proof (the process can resume in the event of a crash without loss of data). It is possible there is a lot of data to move and thus many points at which flushing must be done. Thus, it is during this activity that delays might be required at specific points to insure that writes have actually made it to the disk.

A simple example of a reasonably efficient swap process would involve the use of a fifty-megabyte swap region. At one megabyte per second average transfer rate, it would take fifty seconds to write all this data. If the disk controller had a one-megabyte write cache then it would take one second of free time for the cache to be flushed to disk. Therefore, at some point after writing the fifty-megabyte swap region, a (cumulative) one-second delay in disk transfers to the disk controller is inserted in order to insure the one megabyte cache is flushed (at one megabyte per second). The ratio of fifty seconds of swap region writing to one second of delay is reasonable (a two percent performance hit).

Note that an important aspect to making this ratio reasonable is that the amount of data written between points at which it must be known flushed to the disk can be large (in the last example, fifty-megabytes was used). On the other hand, if only one megabyte was to be written before a flush was required, then the ratio between time spent transferring data and inserted delays becomes much less desirable (one second of writes followed by a one second delay, or a 50% performance hit). The need to have large areas that are written between (effective) flushes dictates an engine design where a given disk location should not require modification, followed by flushing, followed by modification at a rate faster than writing the large areas between flushes, as just described.

Swapping is generally done in the background and is interruptible by user requested disk activity. If in the process of swapping, a free time based flush is required, and the user starts a burst of disk activity, the required delay is simply inserted after the user's activity completes.

Other points in time at which the write cache must be flushed are when the history buffer is being rapidly overwritten and the diversion process is suspended and when the system is shutting down. Neither of these events occur with any frequency and thus adding some amount of delay is of no consequence.

One method of indicating on disk when a block of data is valid is to write out a concluding flag, such as a timestamp or time marker, after a sufficient wait time or amount of disk activity free time has passed.

FIG. 1 illustrates an exemplary initial system state. The first column titled "main area pages" shows the contents of the main area. Locations #1 through #5 contain data. Locations #6 through #9 are not allocated by the OS. The engine returns zeroed data if the OS reads these non-allocated locations. The next column titled "map/TUUN" shows the combined state of the main map, through which OS specified disk locations are translated into actual physical locations, and the TUUN map. An empty box indicates no mapping is required. The status "truly" indicates the associated OS location is truly unused. The third column titled "extra pages/hist hdrs" shows the contents of the extra page area and associated history headers. The arrow at the top of the column indicates the next write position. The last column titled "AUOS" represents entries submitted by the OS for the engine to track almost unused OS storage. Initially the history headers and the AUOS table are not tracking any information.

Figure 2:
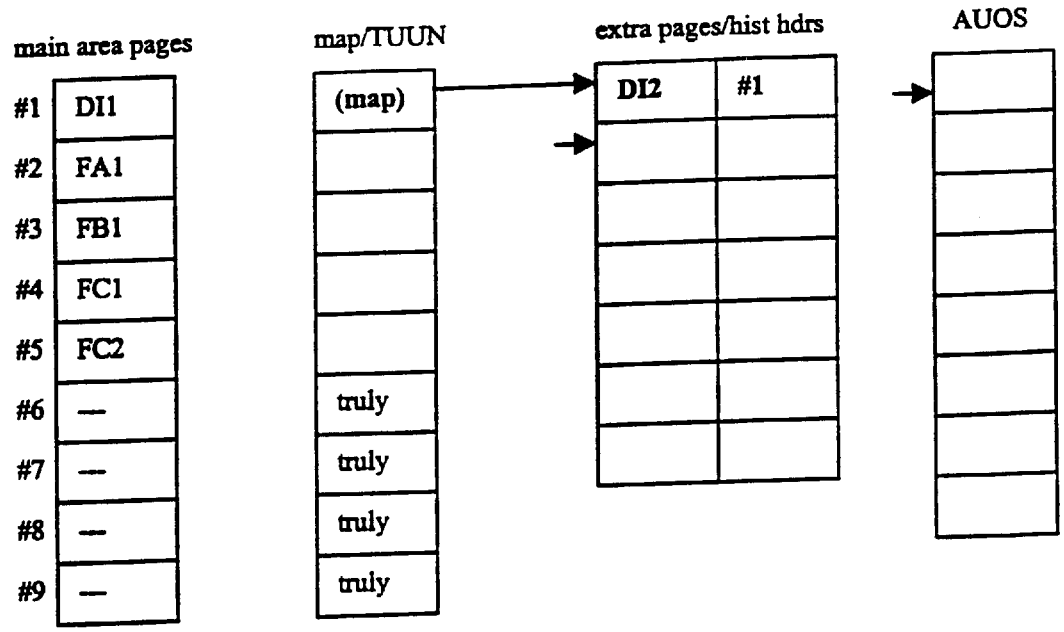
FIG. 2 is block diagram showing an exemplary system wherein the operating system (OS) writes to location #1, in accordance with an embodiment of the present invention.

In FIG. 2 the OS writes to location #1 thus overwriting what was the value "DI1" with "DI2". The engine diverts the write to an extra page and makes a note in the history header. Eventually, given some free time, the diverted new data and the original historic data are exchanged (swapped). An entry has been added to the main map that diverts OS read requests from location #1 to the indicated extra page.

Figure 3:
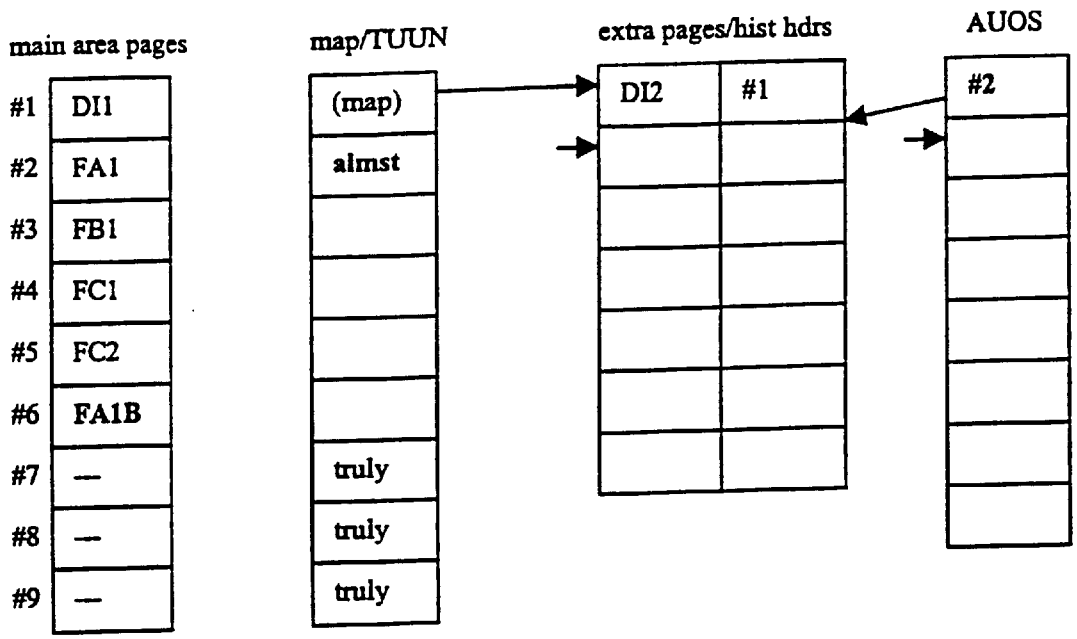
FIG. 3 is block diagram showing an exemplary system wherein the OS releases location #2, and writes directly to location #6, in accordance with an embodiment of the present invention.

In FIG. 3 the OS releases the location #2 which contains "FA1". This might have been caused, for example, by the user replacing the contents of a file whose original contents are at location #2. Instead of returning location #2 to the OS's general allocation pool the OS sets the storage aside and informs the engine. The engine updates the TUUN map and adds an entry to the AUOS table. When the new contents-of the file is then written, the new data "FA1B" goes to the next available OS location: location #6. As the engine and the OS are in agreement that this location is truly unused, the data is written directly into place (instead of being diverted to an extra page). In contrast to the write that occurred in FIG. 2, the write in FIG. 3 requires no pending swap.

Figure 4:
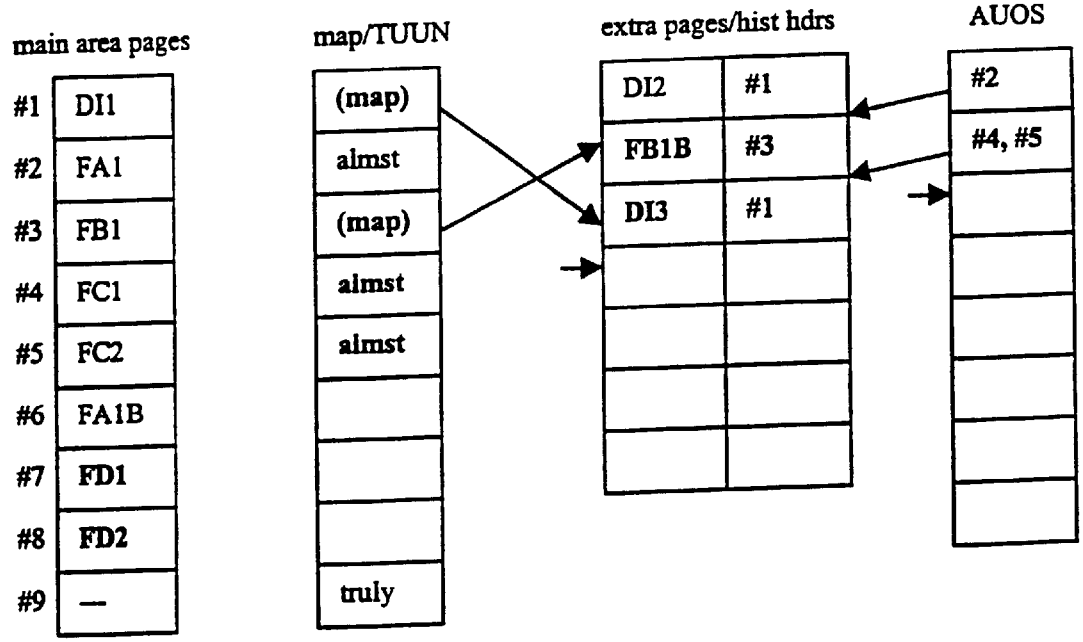
FIG. 4 is block diagram showing an exemplary system wherein the OS writes to locations #1 and #3, releases locations #4 and #5, and writes directly to locations #7 and #8, in accordance with an embodiment of the present invention.

FIG. 4 shows the results of four actions. First, location #3 is overwritten by the OS with new data "FB1B." Second, locations #4 and #5 containing data "FC1" and "FC2" transition into the almost unused state by the OS. Third, location #1 is overwritten by the OS with new data "DI3." For the first and third actions, when locations #3 and #1 are overwritten, the engine diverts each of the writes. When locations #4 and #5 transition to the almost unused state, the engine updates the TUUN map and AUOS table. The releasing of these two locations might have been caused, for example, by the user deleting a file. The OS then writes new data "FD1" and "FD2" to locations #7 and #8, in a fourth action. This overwrite could have been caused by the user creating a new file and writing "FD1" and "FD2" to it. The OS selects the next two truly unused locations to receive the new data (#7 and #8). The TUUN map is updated showing locations #7 and #8 are no longer considered truly unused, and the empty boxes represent a no mapping required status.

The next step in the example assumes the OS realizes it is low in allocable storage (truly unused). The OS requests the engine to signal back to it the locations (or OS label) of storage the OS had previously set aside as almost unused. In FIG. 4, the oldest historic data in the system is the first diversion that occurred in FIG. 2. However, the storage used to hold the historic data (assuming the pending swap was performed) is in the extra page area which is outside the accessible OS area. The next oldest historic data is the AUOS note made in FIG. 3. This storage can be returned and used by the OS. However, there is generally no reason to have a gap in the historic log because the data beyond the gap (going back in time) is generally not usable as it may have been dependent on the data that had been in the gap.

Therefore, two choices are available. First, the engine can discard, or "trim," historic data in the extra page area until the engine obtains AUOS storage that can be returned to the OS. Second, the engine can "divert" by prematurely return AUOS storage but handle the OS's re-use of such storage as overwriting data that must be preserved.

Figure 5:
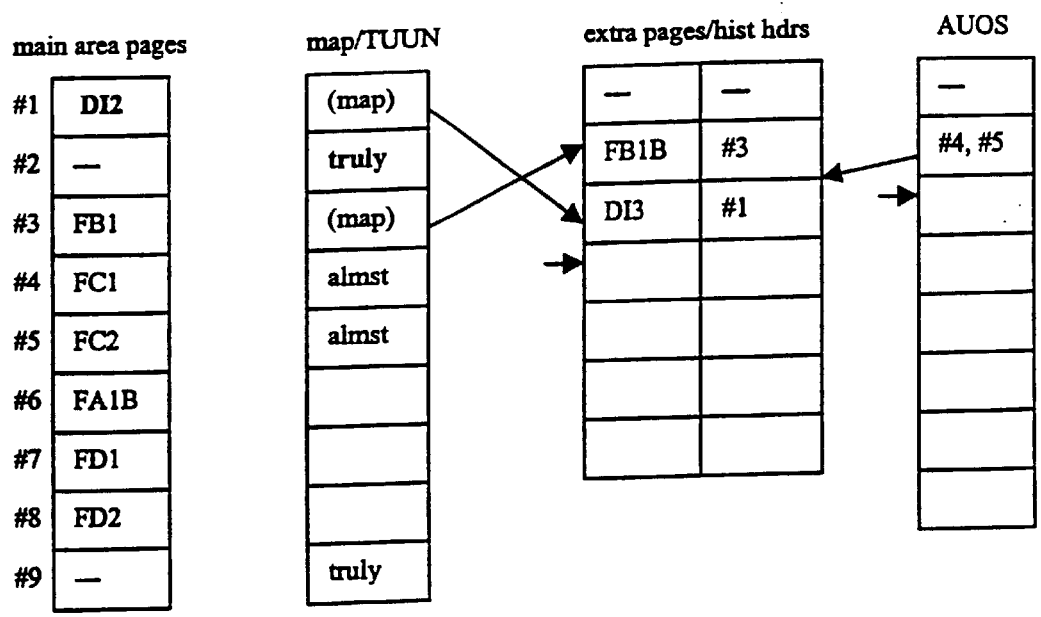
FIG. 5 is block diagram showing an exemplary system wherein trimming has been performed to reclaim disk locations, in accordance with an embodiment of the present invention.

FIG. 5 illustrates the first choice: trimming. The historic tracking of data "DI1" is discarded (trimmed), which involves the forced swapping of "DI2" out of the extra page area into the main area at location #1, and location #2 transitions into the truly unused state as an entry is removed from the AUOS table. When the OS allocates location #2 and writes data to it, the data can be written directly as it is overwriting old historic data that has been discarded by the engine (and OS).

Figure 6:
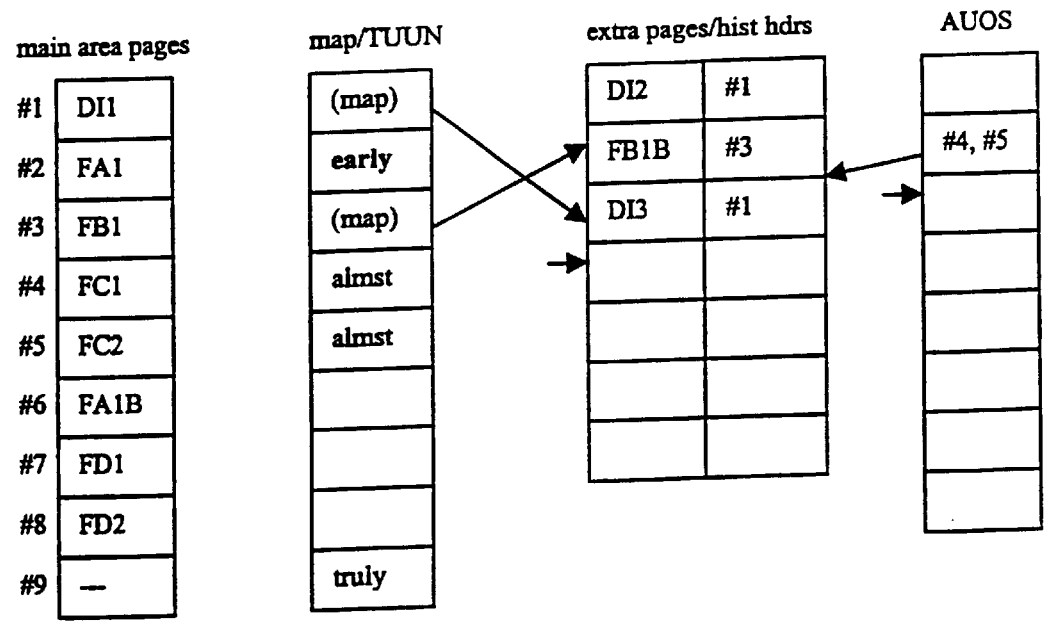
FIG. 6 is block diagram showing an exemplary system wherein the OS has reclaimed location #2, in accordance with an embodiment of the present invention.

FIG. 6 illustrates the second choice: diverting. Here, an entry is removed from the AUOS table and the OS informed accordingly. However, for the affected locations the TUUN map is updated to an "early" status. This means that the location contains historic data required by the engine in order to re-construct the prior state of the disk, and so if the OS attempts to overwrite the location, the change is diverted in order to preserve the historic data. The need to flag the location as "early" means that should the OS attempt to read the location, zeroed data is returned. This prevents the OS from accessing historic data. Note that this "early" status has been introduced here as part of the solution involving prematurely releasing almost unused storage.

The reason the above mentioned methods of "trim" and "divert" are utilized is because history is a chronological series of events. Inherent in this is the fact that two "books" recording different parts of the historic log can represent a complete history, so long as when the books are combined a complete history is known. However, as the current example has shown, a complete history can only go as far back as all information from all required sources is available. In the case of the ATF method, part of the historic log is tracked by the extra page/history header system and another part of the historic log is tracked by the OS and the AUOS system. These two systems age data at different rates reflective of the relative frequency at which the OS is overwriting and/or releasing and allocating data. Generally, the relative rates are not guaranteed because they are dynamic and dependent on arbitrary usage patterns. For example, if there is mostly overwriting occurring by the OS, the extra page/history header system will track most of the historic data with the storage that might be used, which is under the OS control, is never being utilized.

In order to achieve full utilization of available (truly unused) disk space, preferably one "log" is used. In the prior patent applications the Temp and Always methods had the engine relatively completely controlling the management of disk space available for historic tracking. On the other hand, the File method assumed integration of the historic tracking process into the OS. Thus, the OS effectively maintained the one historic log.

In one embodiment, the ATF method is altered such that most of its storage is dynamically taken from and returned to the OS. The situation leading into FIG. 5 would then involve the engine releasing back to the OS the portion of storage in the "extra page area" holding "DI1" (assuming a swap is performed).

In a preferred embodiment, the ATF method utilizes two historic logs that are combined to form the required complete log. The ATF method therefore maintains reasonable independence from the OS by having its own extra page area as well as utilizes of a portion of the available "free" space under the OS's control. The ATF method gains simplicity (and relative independence from the OS) by having a block of dedicated storage under its own control (history buffer). The ATF method gains performance by coordinating with the OS in the allocation and de-allocation of storage, and maintenance of historic data.

In actual practice, it is likely that most of the historic tracking will go through the coordinated engine/OS handoff process (versus the history buffer). However, the history buffer should be sufficiently large to provide recoverability when something has gone wrong and most of the changes were overwrites requiring diversion. Considering that disk space is relatively inexpensive, it is recommended that the ATF method is implemented where half of the storage assigned for historic tracking is allocated in a history buffer and the other half dynamically taken and returned to the OS's allocable space. If it turns out to be true that most of the historic tracking is done through the engine/OS handoff process, then the use of the history buffer will be relatively limited and therefore its reach into the past will be much greater.

Returning to the trim or divert choice, the decision is preferably made by considering just how far back is reasonable to maintain. If the historic data in the history buffer is very old, as it is predicted to be, then it generally can be discarded. However, if it is reasonably recent and there is plenty of space in the history buffer, then it is best to prematurely return storage to the OS and handle its re-use by the OS by diverting the writes. This will add swap time, but it preserves recoverability. If it turns out that the user reasonably lightly uses their PC (relative to the amount of storage allocated for historic tracking) then in any event there will be more historic data—reach back in time—than generally required.

Figure 7:
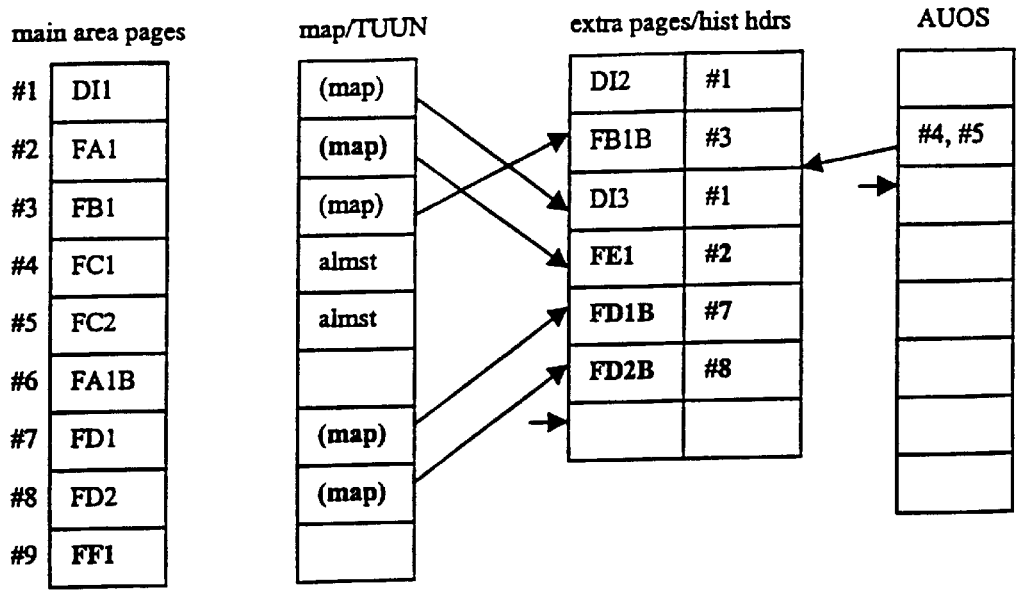
FIG. 7 is block diagram showing an exemplary system wherein the OS overwrites locations #2, #7, and #8, and directly writes location #9, in accordance with an embodiment of the present invention.
Figure 8:
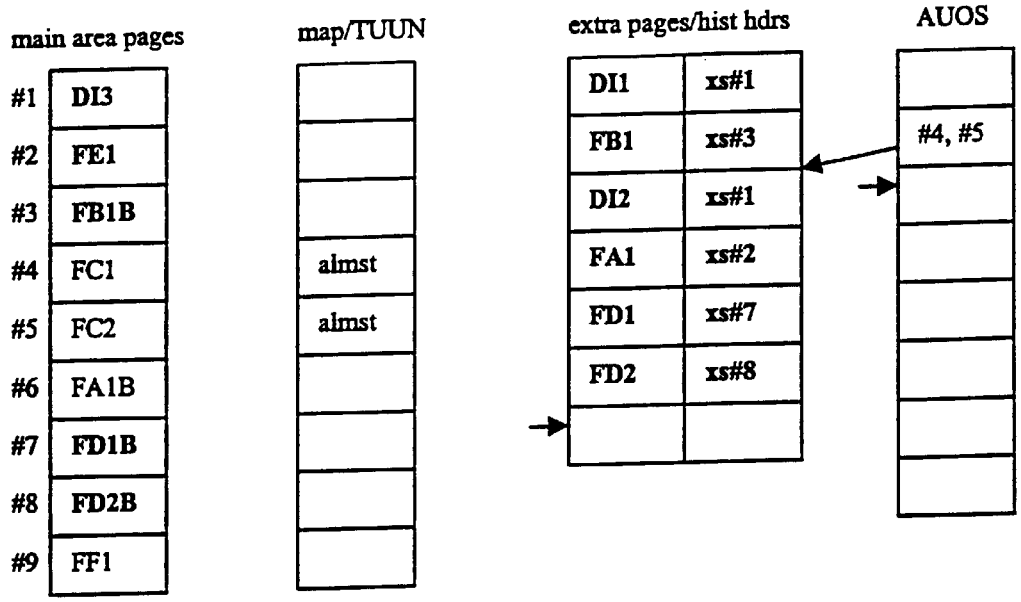
FIG. 8 is block diagram showing an exemplary system wherein the engine has had time to swap all the diverted data, in accordance with an embodiment of the present invention.

Referring back to FIG. 6, the divert decision was made. In FIG. 7 the OS overwrites location #2 with new data "FE1". The overwrite is diverted as location #2 contains historic data. Locations #7 and #8 are also overwritten by the OS with new data "FD1B" and "FD2B". And finally, the OS writes new data "FF1" to truly unused storage at location #9 and so the engine writes the data directly into place. In FIG. 8 the engine has had time to swap all the diverted data so that now the history buffer contains only historic data and the "live" data has been moved into place. Thus, mapping is no longer required.

Figures 9, 10, 11:
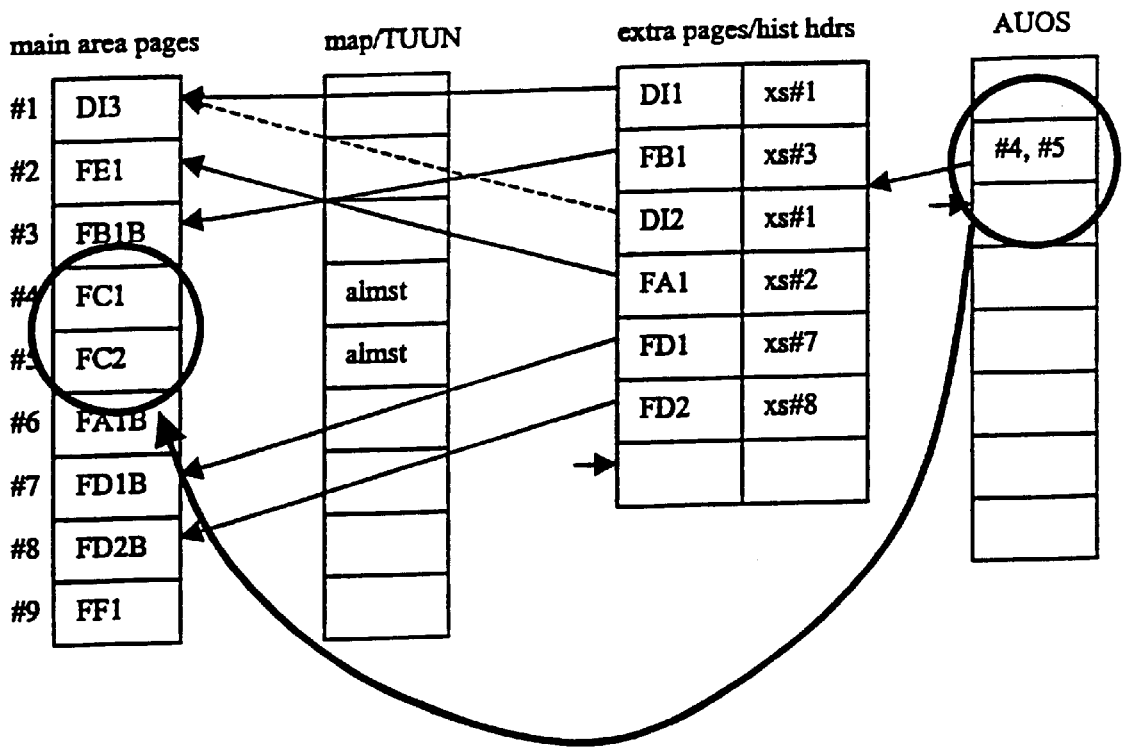
FIG. 9 is a block diagram illustrating a reconstruction the computer disk, in accordance with an embodiment of the present invention.
FIG. 10 is a block diagram showing the initial state from FIG. 1, in accordance with an embodiment of the present invention.
FIG. 11 is a block diagram showing the result of reconstructing the computer disk, in accordance with one embodiment of the present invention.

FIG. 9 illustrates where data is moved, at least conceptually, to show the results of reverting back to the beginning of the current example (FIG. 1). Note that if a given location was overwritten more than once by the OS, then it is the oldest historic data that is restored. The effect of "restoring" the AUOS entry is to remove the almost unused status, which means the affected locations should no longer be forced to zero. If the revert did not span through the AUOS entry then the affected locations would be set to zero in the reverted image.

FIG. 10 shows the initial state from FIG. 1, and FIG. 11 shows the result of moving all the data into place. Note that residue has been left in what was originally truly unused locations. This residue has occurred because the historic log does not contain entries representing the transition of almost unused to truly unused storage. Thus far various conceptual points have been discussed. Now, second step of the ATF design will be described wherein the residue is addressed.

The ATF Second Step Design

The second ATF design combines the history headers with the AUOS table and adds logging of the truly unused transitions. In order to accomplish this merger, a new historic header and associated circular table is created. These new historic headers are not directly associated with extra pages, as were the history header entries. Therefore when a divert type entry is added, an allocated extra page is preferably allocated and a linkage established. If none is available, entries can be removed from the other end of the new historic header table until an extra page is released. Note that this process may also result in the releasing of AUOS storage.

Table 7 below summarizes the three forms of a new historic header and the associated attributes:

TABLE 7

| Diverted Write | Location of new data | Location of old data | Original TUUN status |
|---|---|---|---|
| AUOS entry | Add/take/early | Fields from prior definition | |
| Truly unused overwrite | Location | | |

Figure 12:
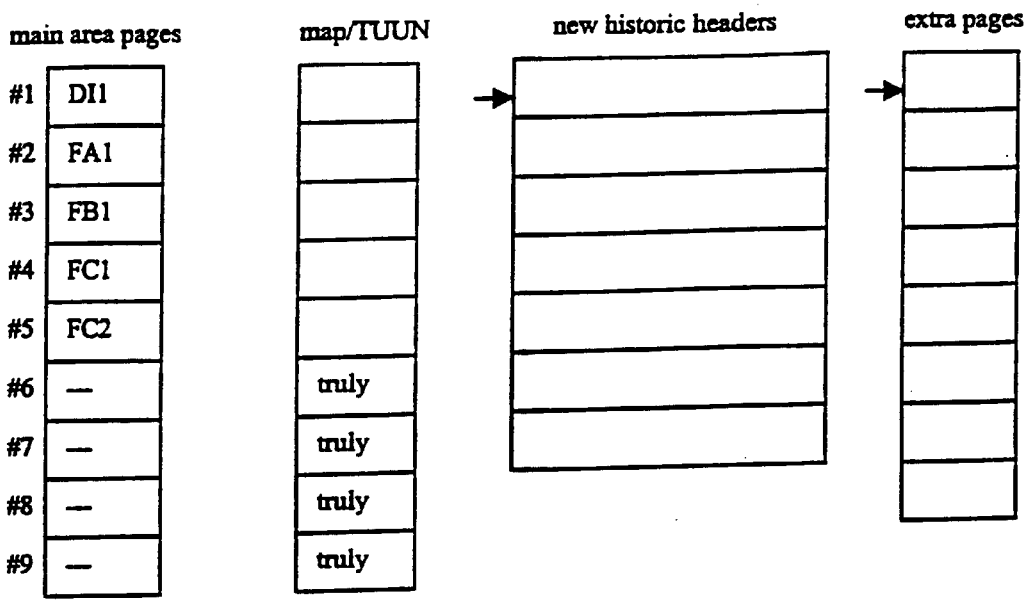
FIG. 12 is block diagram showing an exemplary initial system state, in accordance with an embodiment of the present invention.

FIG. 12 illustrates the initial state of the example from the first ATF design, as set up for the second ATF design using a combined table for history headers and AUOS data. The first column titled "main area pages" shows the contents of the main area. Locations #1 through #5 include data. Locations #6 through #9 are not allocated by the OS. The engine will return zeroed data if the OS reads these non-allocated locations. The next column titled "map/TUUN" shows the combined state of the main map, through which OS specified disk locations are translated into actual physical locations, and the TUUN map. An empty box indicates no mapping is required. The status "truly" indicates the associated OS location is truly unused. The third column titled "new historic headers" illustrates the contents of the history headers associated with the extra pages area, which is shown in the last column titled "extra pages." The new historic header table is now independent from the extra page area, and further includes the AUOS data which is submitted by the OS for the engine to track almost unused OS storage. As shown in FIG. 12, initially the new history headers are not tracking any information.

Figure 13:
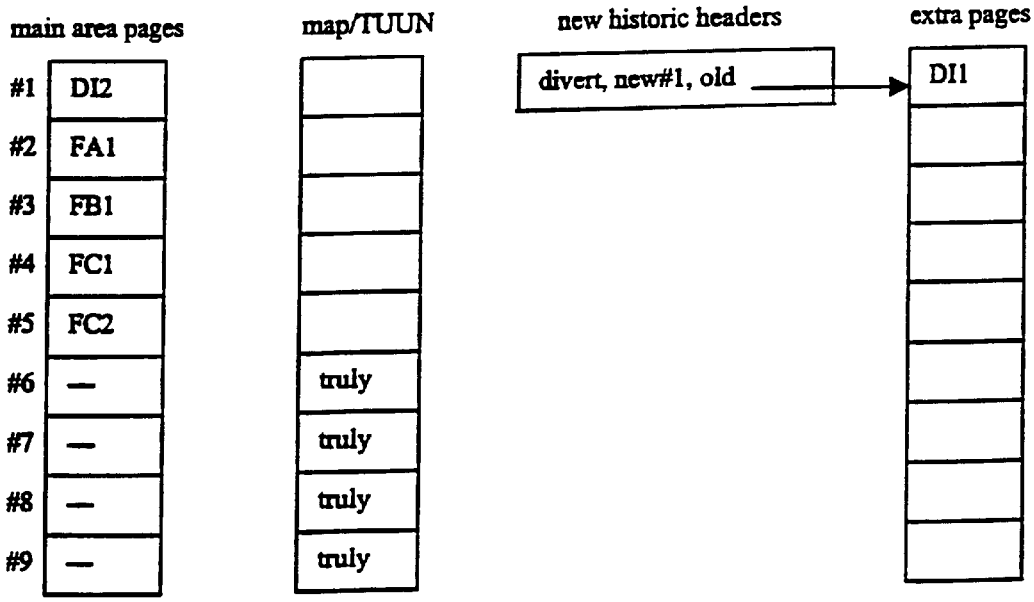
FIG. 13 is block diagram showing an exemplary system wherein the operating system (OS) writes to location #1, in accordance with an embodiment of the present invention.

In FIG. 13 the OS writes to location #1 thus overwriting what was the value "DI1" with "DI2". The engine diverts the write to an extra page and makes a note in the new history headers. Then, when free time occurs, the diverted new data and the original historic data are exchanged (swapped). After the swap occurs, the new history headers able includes an entry indicating that a divert occurred where the new data "DI2" is now located in location #1. The entry also indicates the location in the extra pages area that includes the old data "DI1."

Figure 14:
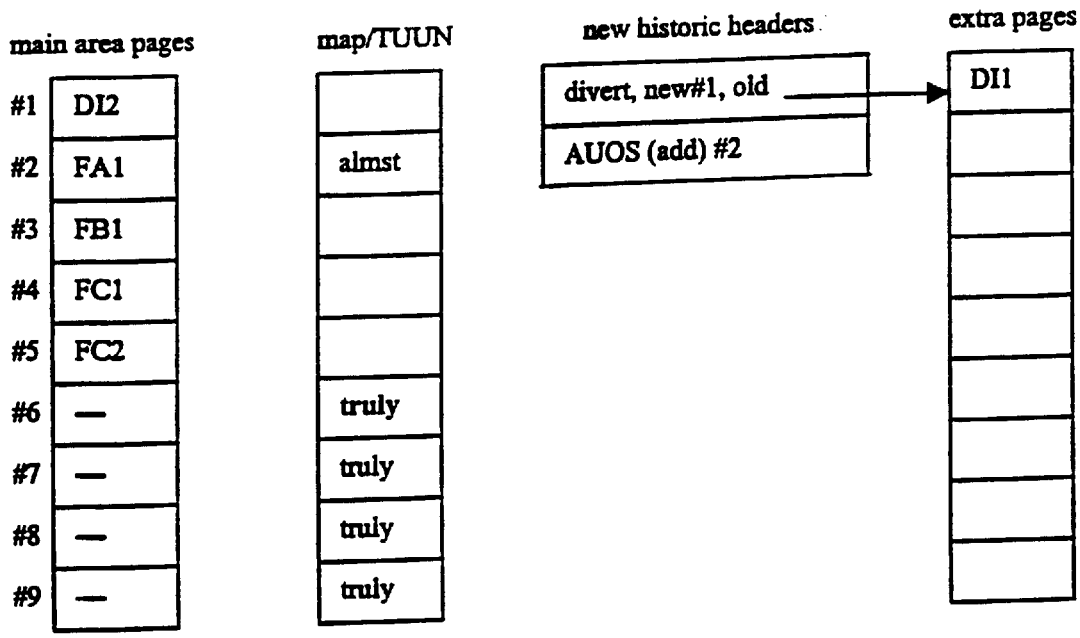
FIG. 14 is block diagram showing an exemplary system wherein the OS releases location #2, in accordance with an embodiment of the present invention.

In FIG. 14 the OS releases the location #2 which contains "FA1". This might have been caused, for example, by the user replacing the contents of a file whose original contents are at location #2. Instead of returning location #2 to the OS's general allocation pool the OS sets the storage aside and informs the engine. The engine updates the TUUN map and adds an entry to the new history headers indicating that location #2 now includes historic data.

Figure 15:
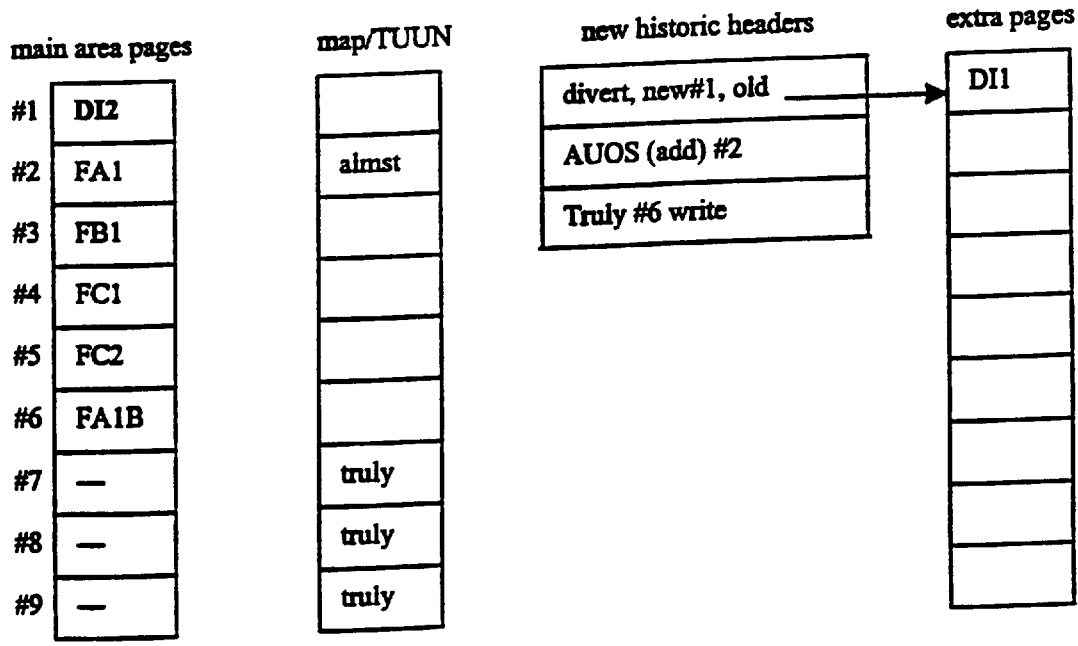
FIG. 15 is block diagram showing an exemplary system wherein the OS writes directly to location #6, in accordance with an embodiment of the present invention.

As shown in FIG. 15, when the new contents of the file is then written, the new data "FA1B" is placed at the next available OS location, which is location #6. As the engine and the OS are in agreement that this location is truly unused, the data is written directly into place (instead of being diverted to an extra page). In contrast to the write that occurred in FIG. 2, the write in FIG. 3 requires no swapping. An entry is made to the new history headers table indicating a direct write has occurred to location #6, without any saving of historic data.

Figure 16:
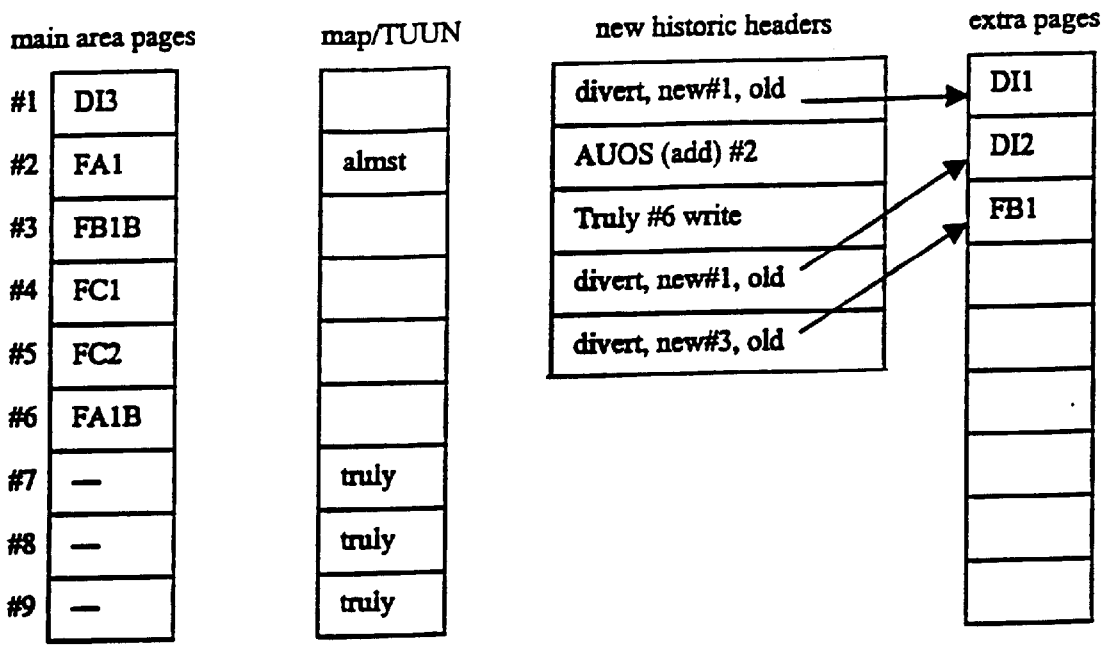
FIG. 16 is block diagram showing an exemplary system wherein the OS writes to locations #1 and #3, in accordance with an embodiment of the present invention.

FIG. 16 illustrates the results of two actions. First, location #1 is overwritten by the OS with new data "DI3." Second, location #3 is overwritten by the OS with new data "FB1B." When location #1 is overwritten, the engine first diverts the new data "DI3" to the next available extra page, which in this case is the second location of the extra pages area, then, when additional time is available, swaps the new data "DI3" with the prior historic data "DI2." Similarly, when location #3 is overwritten, the engine initially diverts the new data "FB1B" to the next available extra page which in this case is the third location of the extra pages area, then, when additional time is available, swaps the new data "FB1B" with the prior historic data "FB1." FIG. 16 illustrates the resulting configuration after the data swaps have occurred.

Figure 17:
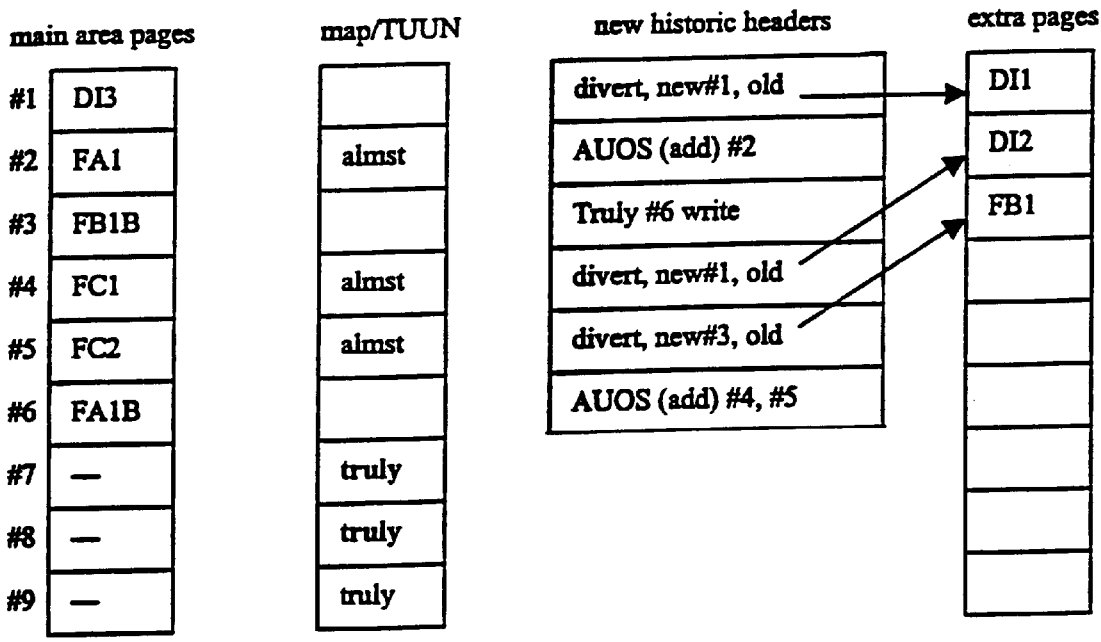
FIG. 17 is block diagram showing an exemplary system wherein the OS releases locations #4 and #5, in accordance with an embodiment of the present invention.

FIG. 17 illustrates locations #4 and #5, which include data "FC1" and "FC2," transitioning into the almost unused state by the OS, for example, by the user deleting a file. When locations #4 and #5 transition to the almost unused state, the engine updates the TUUN map and new history headers table.

Figure 18:
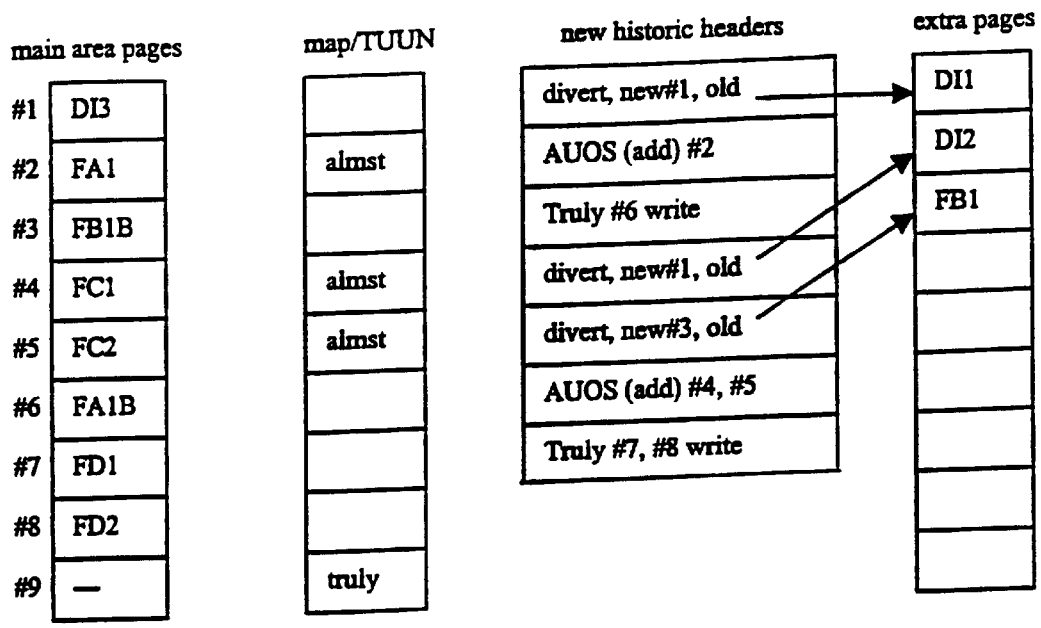
FIG. 18 is block diagram showing an exemplary system wherein the OS writes directly to locations #7 and #8, in accordance with an embodiment of the present invention.

FIG. 18 illustrates the OS writing new data "FD1" and "FD2" to locations #7 and #8. This overwrite could have been caused by the user creating a new file and writing "FD1" and "FD2" to it. The OS selects the next two truly unused locations to receive the new data (#7 and #8). The TUUN map is updated showing locations #7 and #8 are no longer considered truly unused, and the empty boxes represent a no mapping required status. In addition, an entry is made to the new history headers table indicating a direct write has occurred to location #7 and #8, without any saving of historic data.

Figure 19:
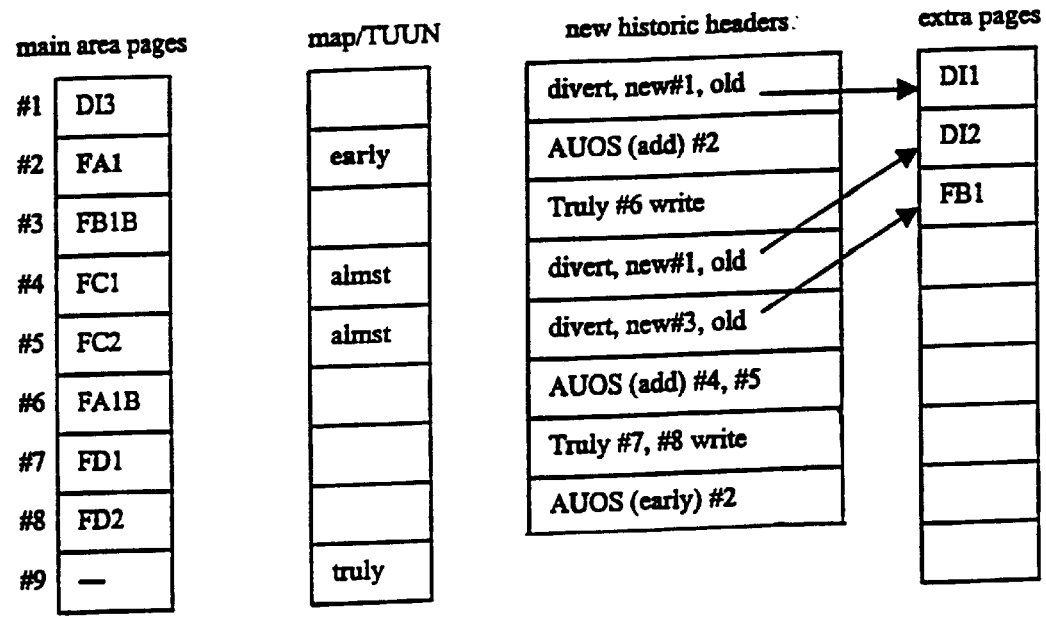
FIG. 19 is block diagram showing an exemplary system wherein the OS has reclaimed location #2, in accordance with an embodiment of the present invention.

FIG. 19 illustrates location #2 being requested back by the OS. The associated location in the TUUN map is updated to an "early" status, which indicates that the location contains historic data required by the engine in order to re-construct the prior state of the disk. In this manner, if the OS attempts to overwrite location #2, the change will be diverted in order to preserve the historic data "FA1." As mentioned previously, when a location is flagged as "early" and the OS attempts to read the location, zeroed data is returned. This prevents the OS from accessing historic data.

Figure 20:
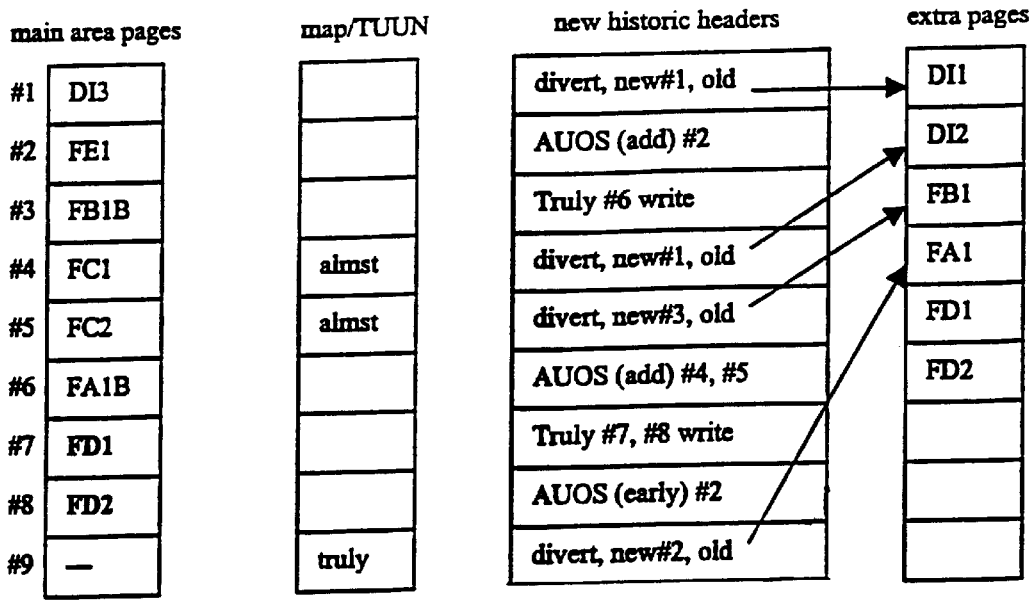
FIG. 20 is block diagram showing an exemplary system wherein the OS overwrites location #2, in accordance with an embodiment of the present invention.

FIG. 20 illustrates the OS overwriting location #2 with new data "FE1." The overwrite is initially diverted to the extra pages area since location #2 contains historic data "FA1." Then, when time is available, the engine swaps the new data "FE1" with the historic data "FA1." FIG. 20 illustrates the resulting configuration after the swap has occurred. Like the above described diverted writes, the new historic headers table is updated to indicate that a divert has occurred, with the new data located at location #2, and a link to the extra page containing the related historic data.

Figure 21:
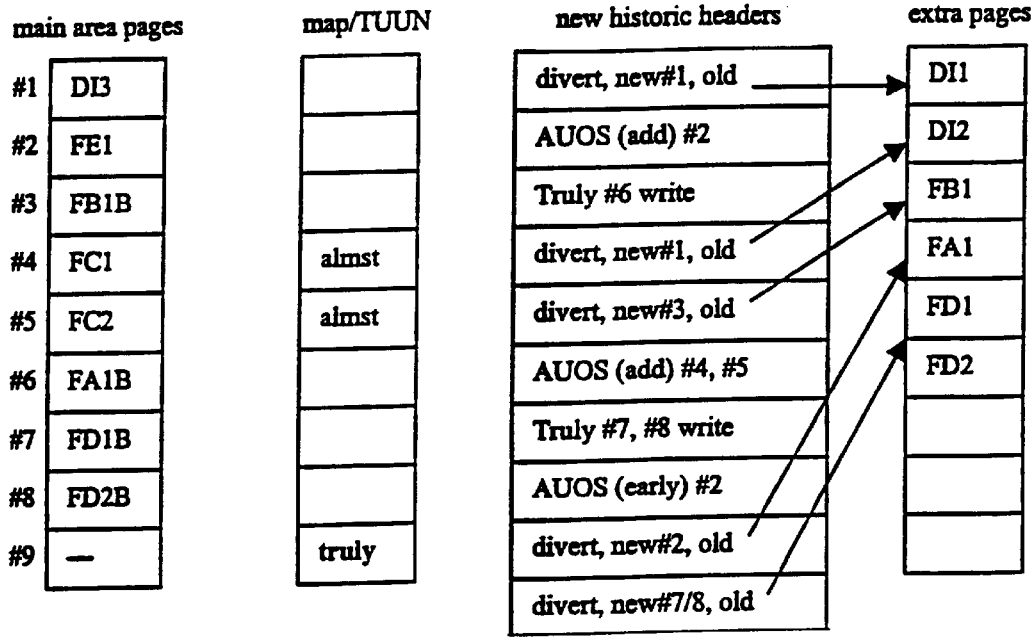
FIG. 21 is block diagram showing an exemplary system wherein the OS writes to locations #7, and #8, in accordance with an embodiment of the present invention.

In FIG. 21 locations #7 and #8 are overwritten by the OS with new data "FD1B" and "FD2B". The engine diverts the writes to extra page areas and makes a note in the new history headers. Then, when free time occurs, the diverted new data and the original historic data are exchanged (swapped).

Figure 22:
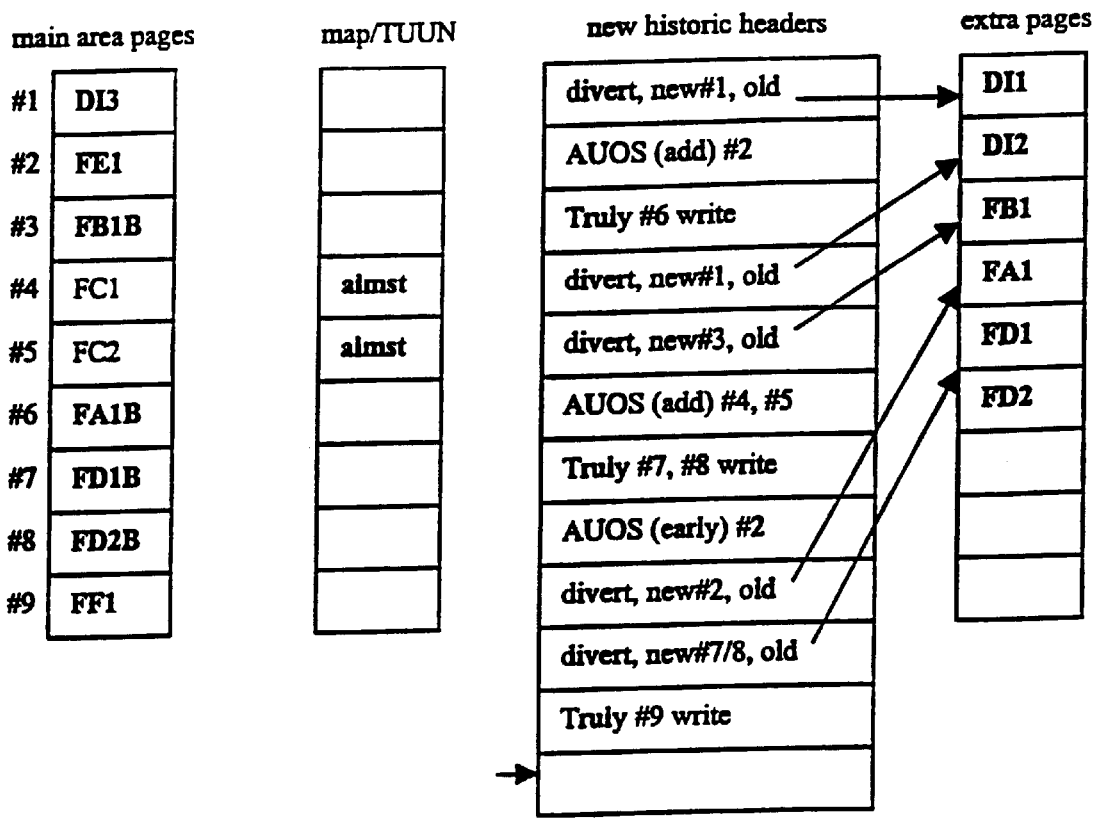
FIG. 22 is block diagram showing an exemplary system wherein the OS directly writes to location #9, in accordance with an embodiment of the present invention.

In FIG. 22 the OS writes new data "FF1" to truly unused storage at location #9 and so the engine writes the data directly into place. FIG. 22 shows the final state after all the steps in the prior example are applied here (and swapping performed).

Figure 23:
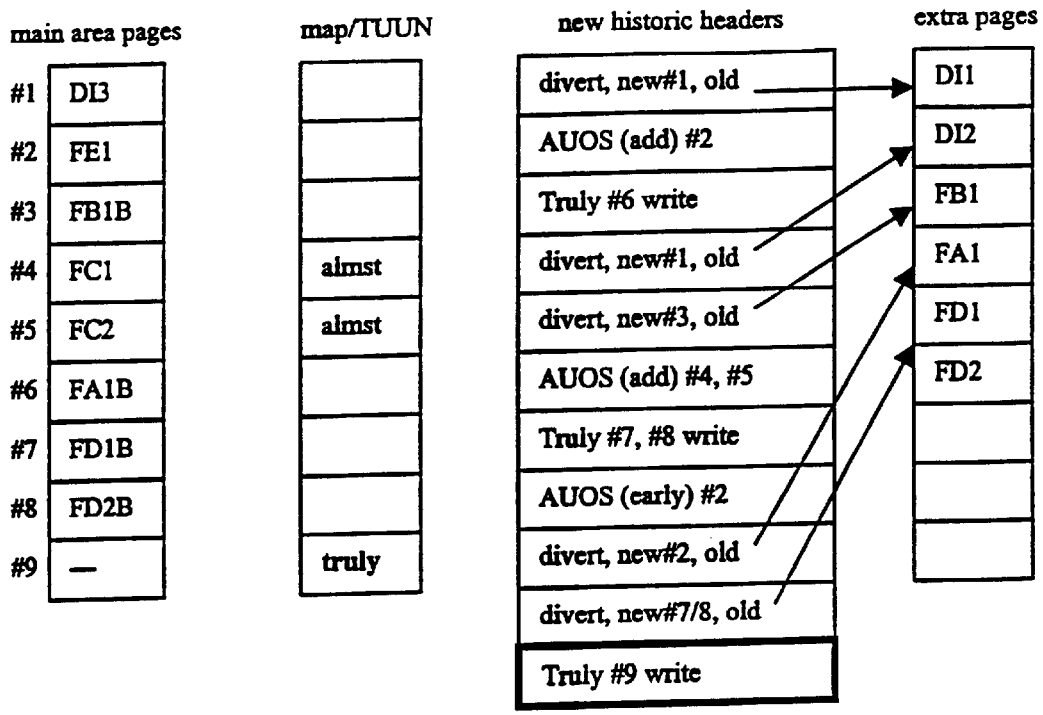
FIG. 23 is block diagram showing an exemplary system wherein the engine reverts to a state prior to the OS direct write to location #9, in accordance with an embodiment of the present invention.

FIGS. 23 through 33 show the progressive "popping" or undoing of new historic headers, thus reverting the current image back in time to its initial state. Specifically, FIG. 23 is an illustration showing the results of reverting back to the last operation, described in association with FIG. 22. The engine examines the latest entry in the new history headers table, which is "Truly #9 write." Accordingly, the engine marks the TUUN map at the location related to location #9 as truly unused. Further, OS accesses to location #9 will now return zeroed information. It should be noted that the actual contents of location #9 does not need to be erased as long as the engine returns zeroed data when location #9 is accessed by the OS.

Figure 24:
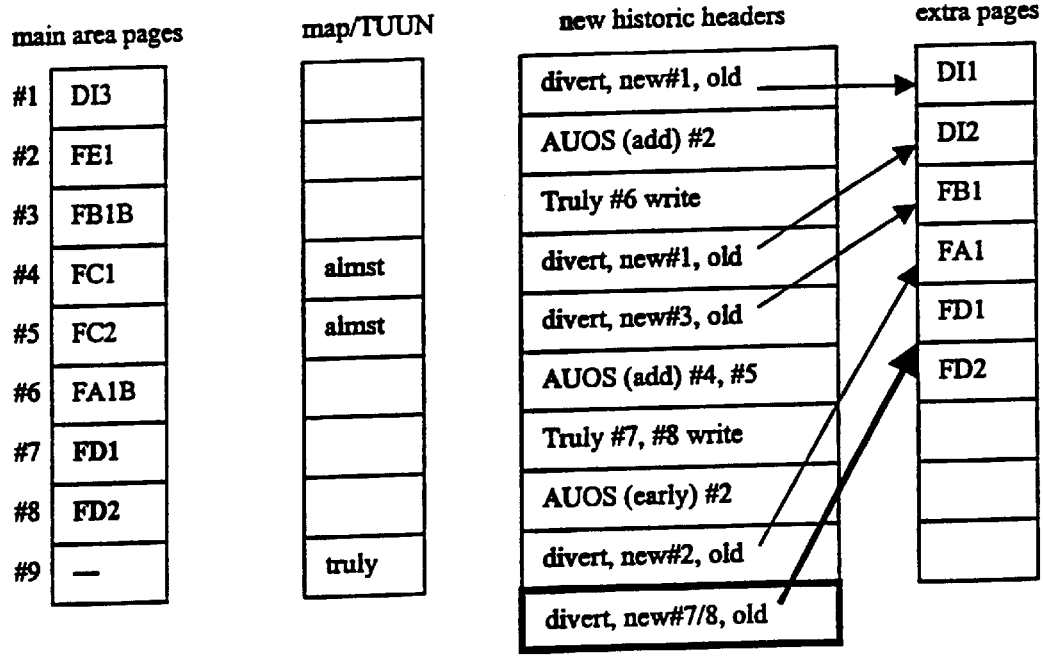
FIG. 24 is block diagram showing an exemplary system wherein the engine reverts to a state prior to the OS write to locations #7, and #8, in accordance with an embodiment of the present invention.

In FIG. 24 the engine examines the next latest entry in the new historic headers table, which is "divert, new#7/8, old." This entry indicates that a divert was performed, with the new data stored at locations #7 and #8. In addition, the entry includes a link to the old data, which is located in the extra pages area. Accordingly, the old data "FD1" and "FD2" is written to locations #7 and #8.

Figure 25:
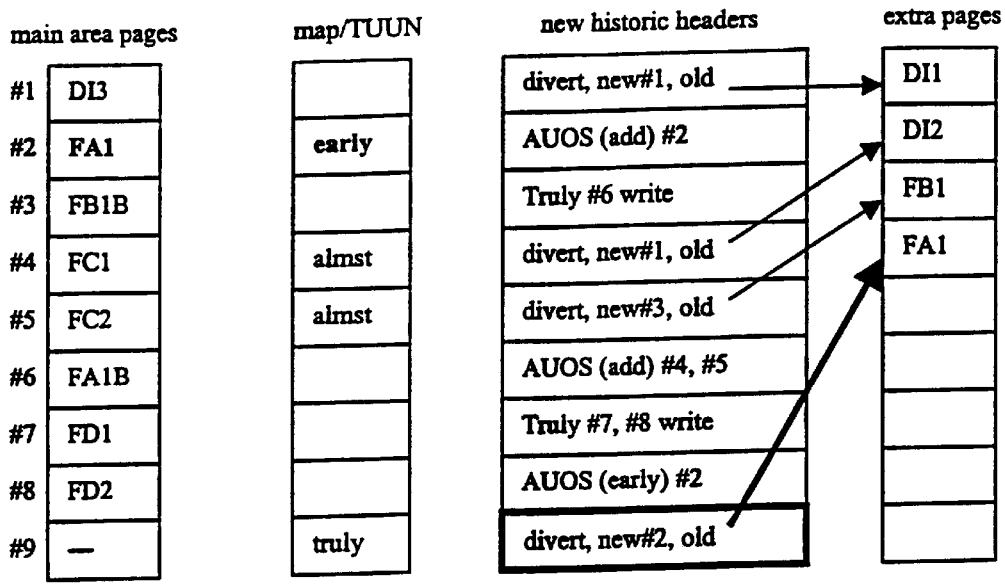
FIG. 25 is block diagram showing an exemplary system wherein the engine reverts to a state prior to the OS overwrite of location #2, in accordance with an embodiment of the present invention.

In FIG. 25 the engine examines the next latest entry in the new historic headers table, which is "divert, new#2, old." In a manner similar to that described with reference to FIG. 24, the engine writes the old data "FA1" to location #2.

Figure 26:
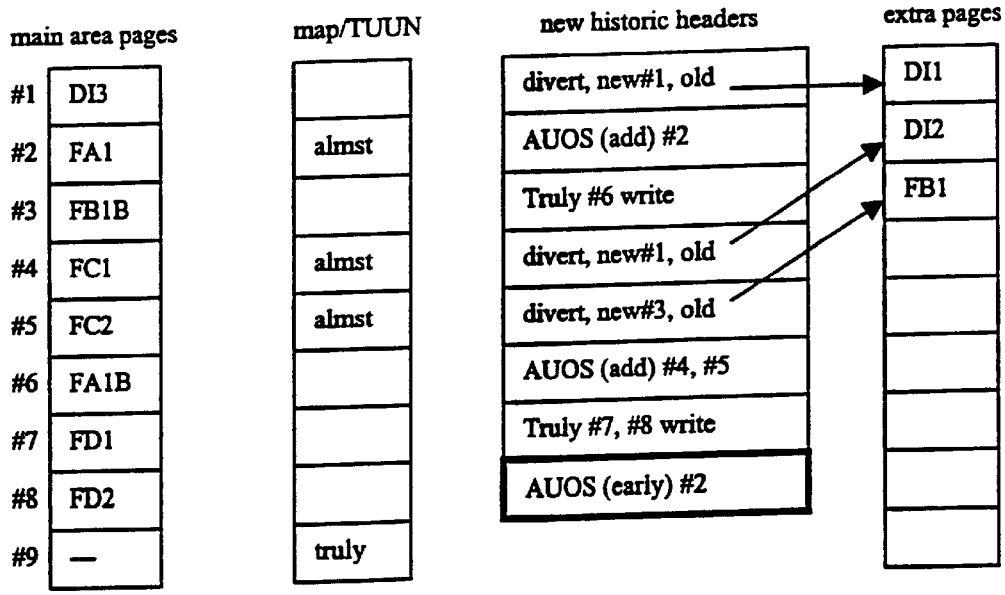
FIG. 26 is block diagram showing an exemplary system wherein the engine reverts to a state prior to the OS reclaiming location #2, in accordance with an embodiment of the present invention.

FIG. 26 illustrates the results of the engine reverting back to the next entry in the new historic headers table, which is "AUOS (early) #2," indicating the OS had requested location #2 back. Hence, location #2 is reverted back to its state before the OS request by altering the TUUN map to replace the related "early" entry with an "almst" entry.

Figure 27:
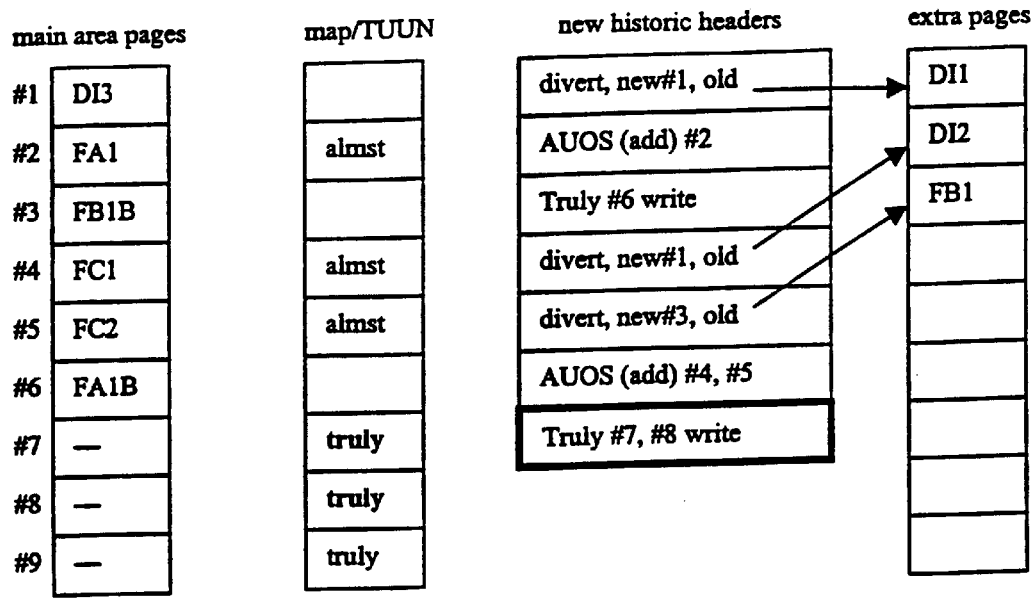
FIG. 27 is block diagram showing an exemplary system wherein the engine reverts to a state prior to the OS direct write to locations #7 and #8, in accordance with an embodiment of the present invention.

The engine next examines the next entry in the new history headers table, which is "Truly #7, #8 write," in FIG. 27. Accordingly, the engine marks the TUUN map at the locations related to locations #7 and #8 as truly unused. Further, OS accesses to locations #7 and #8 will now return zeroed information.

Figure 28:
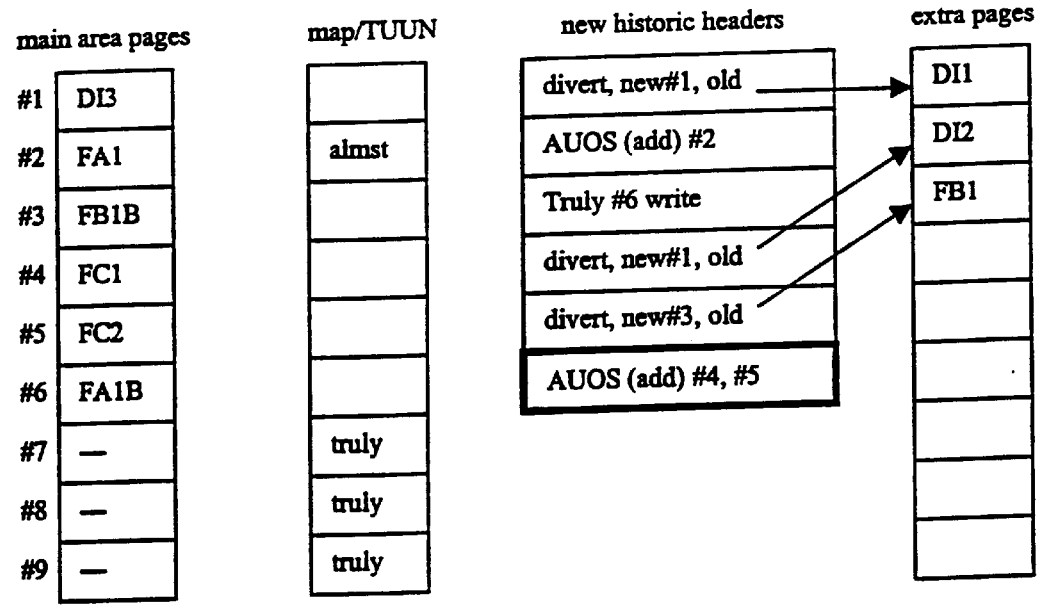
FIG. 28 is block diagram showing an exemplary system wherein the engine reverts to a state prior to the OS release of locations #4 and #5, in accordance with an embodiment of the present invention.

In FIG. 28, the next new historic headers table entry is examined. The entry "AUOS (add) #4, #5" indicates that the OS released locations #4 and #5. Accordingly, the engine reverts to the state prior to the OS release of locations #4 and #5 by altering the TUUN map to remove the "almst" entries related to these locations.

Figure 29:
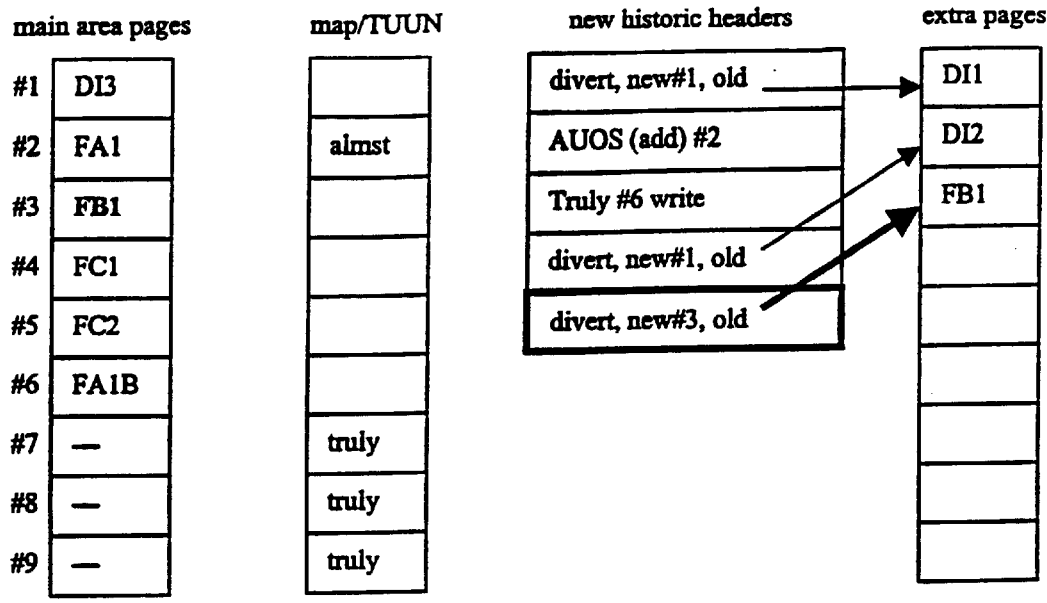
FIG. 29 is block diagram showing an exemplary system wherein the engine reverts to a state prior to the OS write to location #3, in accordance with an embodiment of the present invention.

In FIG. 29 the engine examines the next latest entry in the new historic headers table, which is "divert, new#3, old." This entry indicates that a divert was performed, with the new data stored at location #3. In addition, the entry includes a link to the old data, which is located in the extra pages area. Accordingly, the old data "FB1" is written to location #3.

Figure 30:
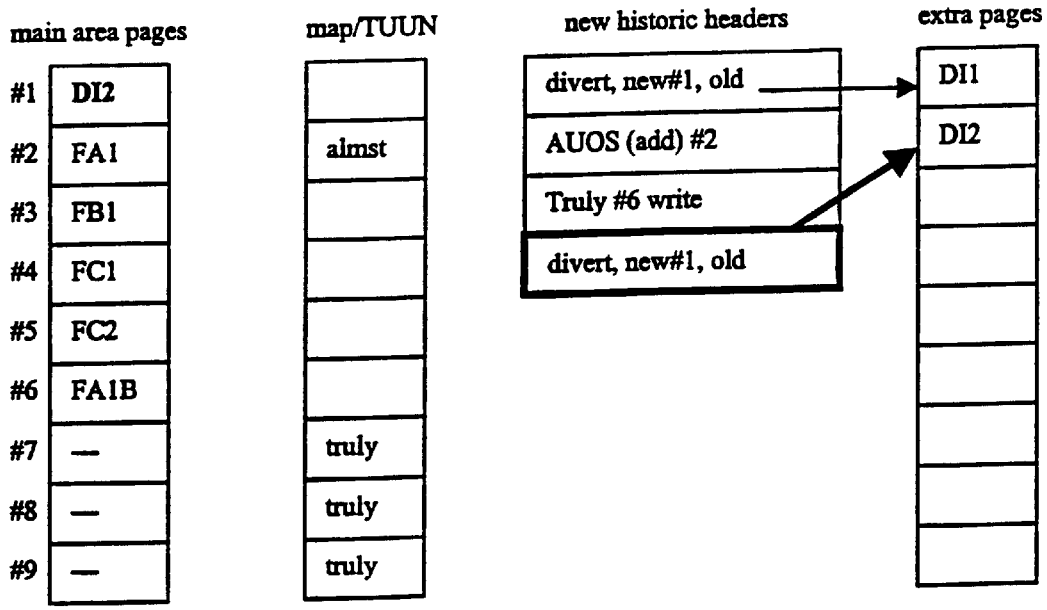
FIG. 30 is block diagram showing an exemplary system wherein the engine reverts to a state prior to the OS write to location #1, in accordance with an embodiment of the present invention.

In FIG. 30 the engine examines the next latest entry in the new historic headers table, which is "divert, new#1, old." In a manner similar to that described with reference to FIG. 29, the engine writes the old data "DI2" to location #1.

Figure 31:
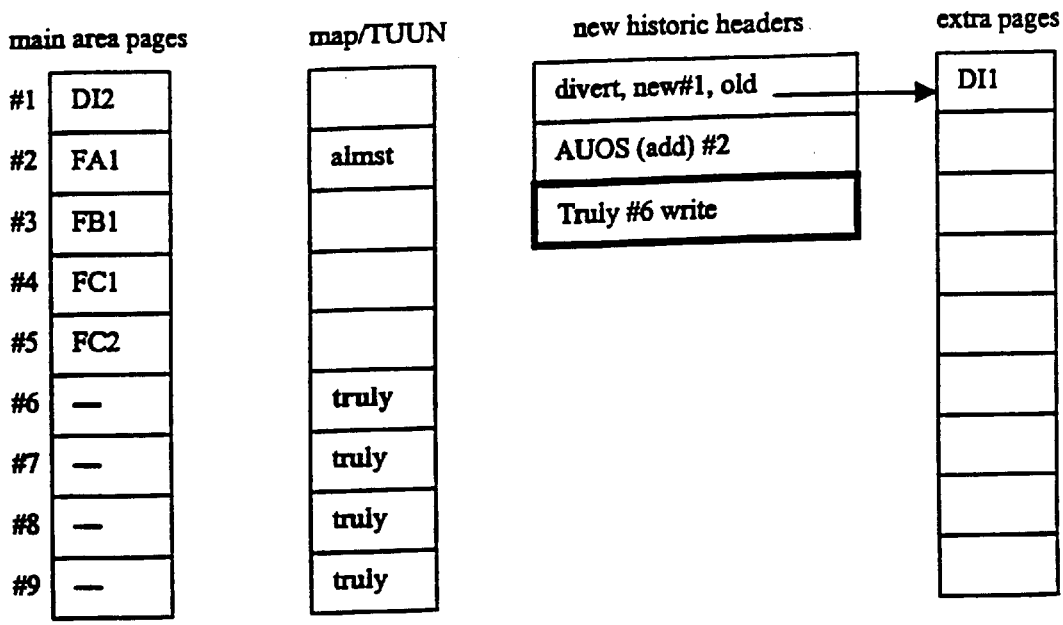
FIG. 31 is block diagram showing an exemplary system wherein the engine reverts to a state prior to the OS direct write to location #6, in accordance with an embodiment of the present invention.

FIG. 31 is an illustration showing the results of reverting back to the next last operation. The engine examines the next entry in the new history headers table, which is "Truly #6 write." Accordingly, the engine marks the TUUN map at the location related to location #6 as truly unused. Further, OS accesses to location #6 will now return zeroed information.

Figure 32:
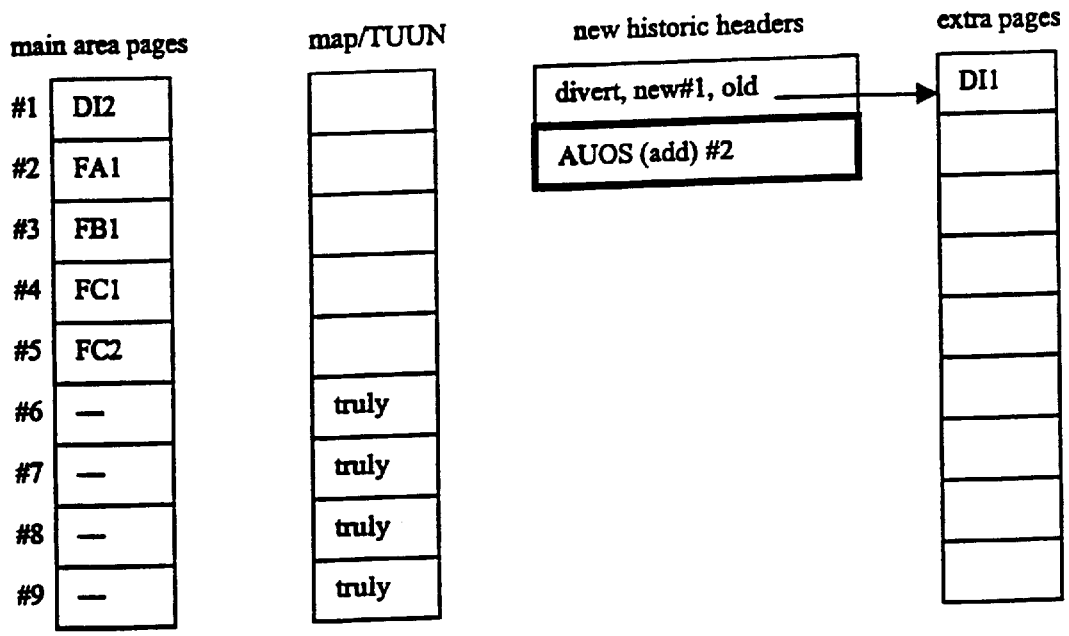
FIG. 32 is block diagram showing an exemplary system wherein the engine reverts to a state prior to the OS release of location #2, in accordance with an embodiment of the present invention.

In FIG. 32, the next new historic headers table entry is examined. The entry "AUOS (add) #2" indicates that the OS released location #2. Accordingly, the engine reverts to the state prior to the OS release of location #2 by altering the TUUN map to remove the "almst" entry related to location #2.

Figure 33:
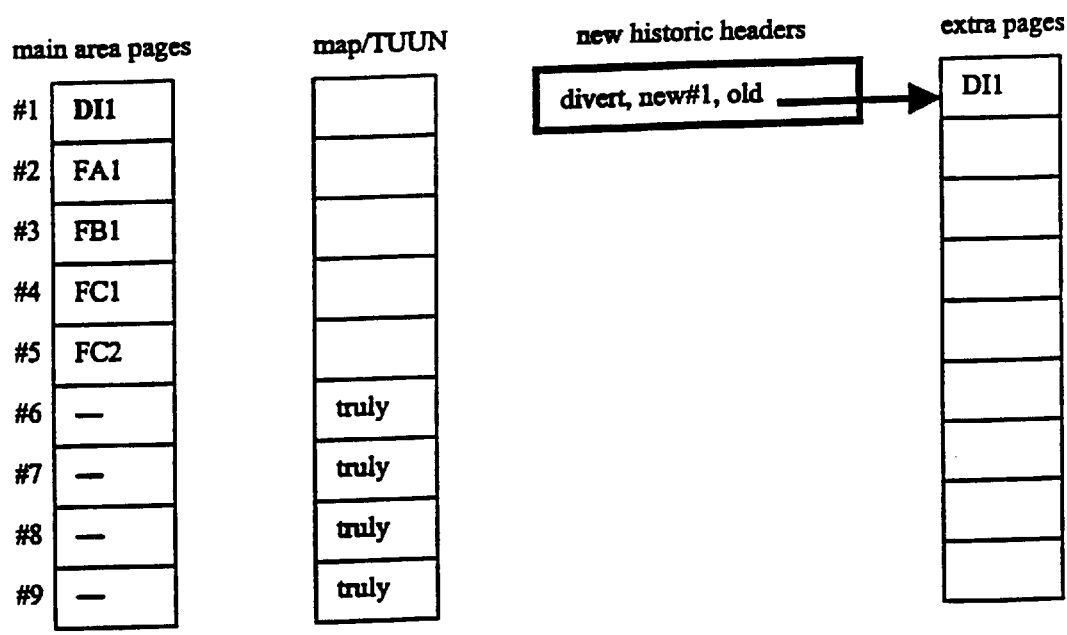
FIG. 33 is block diagram showing an exemplary system wherein the engine reverts to a state prior to the OS write to location #1, in accordance with an embodiment of the present invention.

In FIG. 33 the engine examines the next latest entry in the new historic headers table, which is "divert, new#1, old." In a manner similar to that described with reference to FIG. 30, the engine writes the old data "DI1" to location #1. Unlike FIG. 11, the final result in FIG. 33 matches the initial state. Thus, this design captures the necessary information to support re-creating the OS visible disk at various times in the past.

"Popping" history headers in order to revert a disk to an earlier state, as illustrated in the prior example, accomplishes the reverting task but has the effect of losing the disk's state just prior to the reversion. Thus, the revert cannot be reversed. In another embodiment, the following process is used: walk through the history headers moving (writing) original states back in place until the desired time is reached. During this copy, the writes are still trapped and old states recorded so that a reversion is reversible.

In addition, AUOS entries processed as part of a revert would be disabled (since when the entry falls off the end of the circular buffer the associated storage should not transition to be truly unused). When a truly unused write entry is processed as part of a revert, a new entry type—a backwards truly unused write entry—should be added indicating the specified location should return zero if read by the OS (for security purposes), but its contents should continue to be protected from direct overwrite.

Thus, in the event of a crash the current TUUN map can be reconstructed from the new historic header table combined with a recent snapshot of the system. The snapshot corresponds to some point in the new historic header table. The snapshot is then run forward using the entries at and beyond the snapshot reference point from the table in order to reconstruct its current state.

The ATF method has some degree of file system knowledge and certain historic information is maintained in such a way that the OS can quickly access the data (i.e., an old version of a file has simply been set aside in a renamed temp file). Thus, for example, the retrieval of specific files from almost unused storage can be very fast. However, generally either directly accessing almost unused storage or creating a virtual drive based in part on such provides sufficiently fast retrieval.

There is an important advantage to the ATF method that is borrowed from its File method component, at least for certain types of operations like entirely replacing a file's contents. Because the OS does the initial data preservation by setting aside the storage, if the user quickly overwrites the same file multiple times, the OS preserves each version. This occurs even when overwritten versions exist only in RAM and are never actually written out to disk (because they are replaced so quickly). The general system activity log that correlates safe points to file (and other) activity can record notes (e.g., OS labels) about where replaced file content (data) was set aside and use this information for retrieval. This assumes that the OS does not recycle its AUOS storage within a single safe point.

If the ATF and Always methods are implemented in software and subject to the possibility of corruption, it is reasonably possible to "walk off" the ATF method and yield some form of usable disk image. The concept of walking off a method is to disable its algorithm with minimal disk changes. The ATF method generally keeps OS visible data directly in the OS assigned location and therefore suddenly disabling its algorithm yields a disk that should be close to some directly OS usable state. On the other hand, the permanent re-mapping of the Always method pretty much insures the disk is unusable (scrambled) if the method is yanked from the disk (i.e., you need to know the mapping in order to access the data). If either method is operating behind a firewall then the issue of walking the method off the disk does not apply.

Both the Always and ATF methods can be used with non-standard disk de-fragmentation software. Since the ATF method tends to keep the disk in its native organization, it is likely easier to adapt an existing de-fragmentation program to simply do the re-arranging through the engine's interface. On the other hand, a user generally needs only one de-fragmentation utility and such can be provided under either method with about the same effort.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A method for recovering data, comprising the operations of:

creating a record of historic states of a disk, the disk including a disk location X, a disk location Y, and a disk location Z;

storing new data to the disk location Y in response to a request to overwrite original data at the disk location X;

establishing an indication in the record of historic states indicating roles of the disk location X and the disk location Y;

intercepting a command to release data at the disk location Z; and establishing an indication in the record of historic states indicating the disk location Z stores historic data.

2. A method as recited in claim 1, wherein the record of historic states is a new historic headers table.

3. A method as recited in claim 1, wherein the indication in the record of historic states indicating roles of the disk location X and the disk location Y indicates that a divert occurred.

4. A method as recited in claim 1, wherein the indication in the record of historic states indicating the disk location Z stores historic data establishes that a status of disk location Z is "almost unused."

5. A method as recited in claim 1, further comprising the operations of:

receiving a request to write new data to a disk location T, wherein the disk location T does not include historic data needed in reconstructing the prior state of the disk;

storing the new data directly to the disk-location T in response to the request to write to the disk location T; and establishing an indication in the record of historic states indicating that prior historic data for the disk location T is no longer available.

6. A method as recited in claim 1, further comprising the operations of:

receiving a request to reclaim the disk location Z for later use by the operating system; and establishing an indication in the record of historic states indicating that the disk location Z is available to store new data.

7. A method as recited in claim 6, wherein the indication in the record of historic states indicating that the disk location Z is available to store new data indicates that a status of disk location Z is "early."

8. A method as recited in claim 7, further comprising the operations of:

storing new data to a disk location Y' in response to a request to overwrite original data at the disk location Z; and establishing an indication in the record of historic states indicating roles of the disk location Z and the disk location Y'.

9. A method as recited in claim 1, further comprising the operations of:

transferring the original data at the disk location X to the disk location Y; and transferring the new data at the disk location Y to the disk location X.

10. A computer program embodied on a computer readable medium, the computer program capable of restoring a prior state of a computer disk, the computer program comprising:

a code segment capable of intercepting file management commands from an operating system;

a map that indicates a status of disk locations;

a history table that maps historical data to a main area, the history table further indicating disk locations that have been released by the operating system, wherein entries in the history can be accessed in chronological order; and a code segment that records indications of disk changes in the history table in substantially chronological order.

11. A computer program as recited in claim 10, wherein the map indicates a status of a deleted disk location that has been released by the operating system as "almost unused."

12. A computer program as recited in claim 11, further comprising a code segment that records an indication in the history table that indicates the deleted disk location includes historic data.

13. A computer program as recited in claim 12, wherein the map indicates a status of the deleted disk location as "early" in response to a request from the operating system to reclaim the deleted disk location.

14. A computer program as recited in claim 10, wherein the map indicates a status of an unused disk location that does not have historical data needed to reconstruct a prior state of the disk as "truly unused."

15. A computer program as recited in claim 14, further including a code segment that records an indication in the history table that indicates the unused disk location has received a direct write in response to a request from the operating system to write to the unused disk location.

16. A method for restoring a prior state of a computer readable media, comprising the operations of:

(a) establishing a data structure having entries for historic changes to the computer readable media, wherein the data structure includes a write entry relating to an overwrite of original data at a first data location X with new data, and wherein a release entry in the data structure relates to a release of a data location Z by an operating system;

(b) examining a most recent entry in the data structure in response to a request to reconstruct the computer readable media;

(c) if the most recent entry is a write entry, replacing the new data at first data location X with the original data;

(d) if the most recent entry is a release entry, allowing the operating system to access the released data location Z;

(e) discarding the most recent entry in the data structure; and (f) repeating operations (b)–(f) until the prior state of the computer readable media is restored.

17. A method as recited in claim 16, further comprising the operation of removing data from a true write disk location in response to examining a true write entry, the true write entry relating to a write to the true write disk location wherein the true write disk location does not include historic data needed to reconstruct the computer readable media.

18. A method as recited in claim 16, wherein the operation of allowing the operating system to access the released data location Z includes removing an "almost unused" status from the data location Z.

19. A method as recited in claim 18, wherein the "almost unused" status for the data location Z is recorded in a map that records a status for a plurality of data locations.

20. A method as recited in claim 16, further comprising the operation of establishing an extra pages memory that stores historic data needed to reconstruct the computer readable media.

21. A method for restoring a prior state of a computer readable media, comprising the operations of:
   (a) establishing a data structure having entries for historic changes to the computer readable media, wherein the data structure includes a write entry relating to an overwrite of original data at a first data location X with new data, and wherein a release entry in the data structure relates to a release of a data location Z by an operating system;
   (b) examining a most recent entry in the data structure in response to a request to reconstruct the computer readable media;
   (c) if the most recent entry is a write entry, storing the original data to a disk location Y and establish an entry in the data structure indicating roles of the disk location X and the disk location Y;
   (d) if the most recent entry is a release entry, allowing the operating system to access the released data location Z in response to examining the release entry;
   (e) discarding the most recent entry in the data structure; and
   (f) repeating operations (b)–(f) until the prior state of the computer readable media is restored.

22. A method as recited in claim 21, further comprising the operation of removing data from a true write disk location in response to examining a true write entry, the true write entry relating to a write to the true write disk location wherein the true write disk location does not include historic data needed to reconstruct the computer readable media.

23. A method as recited in claim 21, where in the operation of allowing the operating system to access the released data location Z includes removing an "almost unused" status from the data location Z.

24. A method as recited in claim 23, wherein the "almost unused" status for the data location Z is recorded in a map that records a status for a plurality of data locations.

25. A method as recited in claim 21, further comprising the operation of establishing an extra pages memory that stores historic data needed to reconstruct the computer readable media.

* * * * *

UNITED STATES PATENT AND TRADEMARK OFFICE
CERTIFICATE OF CORRECTION

PATENT NO. : 6,732,293 B1
DATED : May 4, 2004
INVENTOR(S) : Eric D. Schneider

It is certified that error appears in the above-identified patent and that said Letters Patent is hereby corrected as shown below:

<u>Title page,</u>
Item [57], ABSTRACT,
Line 12, delete the word "Ski".

Signed and Sealed this

Twenty-seventh Day of July, 2004

JON W. DUDAS
*Acting Director of the United States Patent and Trademark Office*